(12) United States Patent
Nagahata et al.

(10) Patent No.: US 8,106,997 B2
(45) Date of Patent: Jan. 31, 2012

(54) IMAGE PICKUP APPARATUS

(75) Inventors: Junko Nagahata, Osaka (JP); Hisamo Sogawa, Hyogo (JP); Tsuyoshi Kishimoto, Hyogo (JP); Toshio Katayama, Osaka (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/421,828

(22) Filed: Apr. 10, 2009

(65) Prior Publication Data

US 2009/0262233 A1    Oct. 22, 2009

(30) Foreign Application Priority Data

Apr. 22, 2008 (JP) ................................ 2008-110980

(51) Int. Cl.
*G03B 13/36* (2006.01)
(52) U.S. Cl. ........................ 348/345; 348/346
(58) Field of Classification Search .................. 348/345, 348/346; 396/121–123, 147
See application file for complete search history.

(56) References Cited

U.S. PATENT DOCUMENTS

| | | | | |
|---|---|---|---|---|
| 4,575,212 A | * | 3/1986 | Kitaura et al. ................ | 396/102 |
| 5,604,538 A | * | 2/1997 | Kaneda et al. ................ | 348/353 |
| 7,697,834 B1 | * | 4/2010 | Tsai ............................... | 396/147 |
| 7,903,168 B2 | * | 3/2011 | Pillman et al. ................ | 348/345 |
| 7,957,633 B2 | * | 6/2011 | Uehara .......................... | 396/124 |
| 2009/0262233 A1 | * | 10/2009 | Nagahata et al. ............. | 348/341 |
| 2010/0060780 A1 | * | 3/2010 | Shibagami et al. ........... | 348/345 |

FOREIGN PATENT DOCUMENTS

JP    2007-171298    7/2007

OTHER PUBLICATIONS

U.S. Appl. No. 12/594;435; filed Oct. 2, 2009, Kishimoto, et al.

* cited by examiner

*Primary Examiner* — Wi. B. Perkey
(74) *Attorney, Agent, or Firm* — Oblon, Spivak, McClelland, Maier & Neustadt, L.L.P.

(57) ABSTRACT

In an image pickup apparatus, a light receiving unit produces a first signal at a first timing and a second signal at a second timing later than the first timing. First and second parameters for detecting a scene change are acquired based on the first and second signals, respectively. The presence or the absence of a scene change is determined based on both the parameters. The apparatus further includes a selecting unit configured to select a focusing target AF area from among a plurality of AF areas, and a focusing control unit configured to execute focusing control by using focusing information with respect to the AF area selected by the selecting unit. When the determining unit determines that the scene change is not present, the selecting unit selects the AF area having been selected at the first timing, as the focusing target AF area, at the second timing continuously.

16 Claims, 14 Drawing Sheets

IMAGE PICKUP APPARATUS

BACKGROUND OF THE INVENTION

1. Field of the Invention

The present invention relates to an image pickup apparatus, such as a digital camera.

2. Description of the Related Art

In one of autofocusing (AF) techniques for image pickup apparatuses, a focusing target area is selected from among a plurality of AF areas in accordance with predetermined criteria, and a subject in the selected AF area is brought into an in-focus state (see, e.g., Japanese Unexamined Patent Application Publication No. 2007-171298).

SUMMARY OF THE INVENTION

When distances to respective subjects in the plurality of AF areas (i.e., subject distances) are close to one another, the selected AF area is often frequently changed depending on, e.g., measurement accuracy of a distance measuring sensor.

It is here assumed, for example, that in performing AF control to bring the nearest (shortest-distance) subject (i.e., the subject closest to an image pickup apparatus) into an in-focus state (i.e., nearest priority AF control or closest-range priority AF control), one person is present on the left side and another person is present on the right side in a composition (frame) at distances close to each other (i.e., at almost equal subject distances) (see FIG. 13). In such a situation, because the subject distances of both the persons are close to each other, the selected AF area is often frequently changed due to, e.g., a measurement error of the distance measuring sensor. More specifically, an AF area (FR1) positioned relatively toward the left and corresponding to the left-side person is selected as the selected AF area at one point of time (see FIG. 13), and an AF area (FR2) positioned relatively toward the right and corresponding to the right-side person is selected as the selected AF area at another point of time (see FIG. 14).

However, the frequent changes of the selected AF area cause various drawbacks.

For example, when the AF control is performed so as to select one AF area as the selected AF area, the selected AF area is alternately frequently moved to the left-side area and the right-side area. In particular, when one selected AF area is displayed on a display portion (e.g., a backside monitor), a view of the selected AF area on the display portion is alternately frequently moved to the left and the right, thus making a user (operator or photographer) embarrassed. Further, when an exposure operation is executed on the basis of brightness of the selected AF area, the result of exposure control may change to a large extent corresponding to the change of the selected AF area.

Thus, there is a need for an image pickup apparatus capable of suppressing undesired changes of a selected AF area that is selected from among a plurality of AF areas.

An image pickup apparatus according to one embodiment of the present invention includes light receiving means for performing photoelectric conversion of a subject image introduced through an imaging lens, the light receiving means producing a first signal at a first timing and producing a second signal at a second timing later than the first timing, acquiring means for acquiring, based on the first signal, a first parameter for detecting a scene change and acquiring, based on the second signal, a second parameter for detecting a scene change, determining means for determining the presence or the absence of a scene change based on the first parameter and the second parameter, selecting means for selecting a focusing target AF area from among a plurality of AF areas, and focusing control means for executing focusing control by using focusing information with respect to the AF area selected by the selecting means, wherein when the determining means determines that the scene change is not present, the selecting means selects the AF area having been selected at the first timing, as the focusing target AF area, at the second timing continuously.

An image pickup apparatus according to another embodiment of the present invention includes selecting means for selecting a focusing target AF area from among a plurality of AF areas, focusing control means for executing focusing control by using focusing information with respect to the AF area selected by the selecting means, light receiving means for performing photoelectric conversion of a subject image introduced through an imaging lens, the light receiving means producing a first signal at a first timing and producing a second signal at a second timing later than the first timing, acquiring means for acquiring, based on the first signal, a first parameter for detecting a scene change and acquiring, based on the second signal, a second parameter for detecting a scene change, determining means for determining the presence or the absence of a scene change based on the first parameter and the second parameter, and defocus amount calculating means for calculating a defocus amount between a first AF area having been selected as the focusing target AF area at the first timing and a second AF area which is determined as a candidate for the focusing target AF area at the second timing in accordance with a predetermined criterion, wherein when the determining means determines that the scene change is not present and when the defocus amount is within a predetermined value, the selecting means selects the first AF area, as the focusing target AF area, at the second timing continuously.

According to the embodiments of the present invention, undesired changes of the selected AF area, which is selected from the plurality of AF areas for the focusing control, can be suppressed.

DESCRIPTION OF THE PREFERRED EMBODIMENTS

An embodiment of the present invention will be described below with reference to the drawings.

<1. Outline of Construction>

Figure 1:
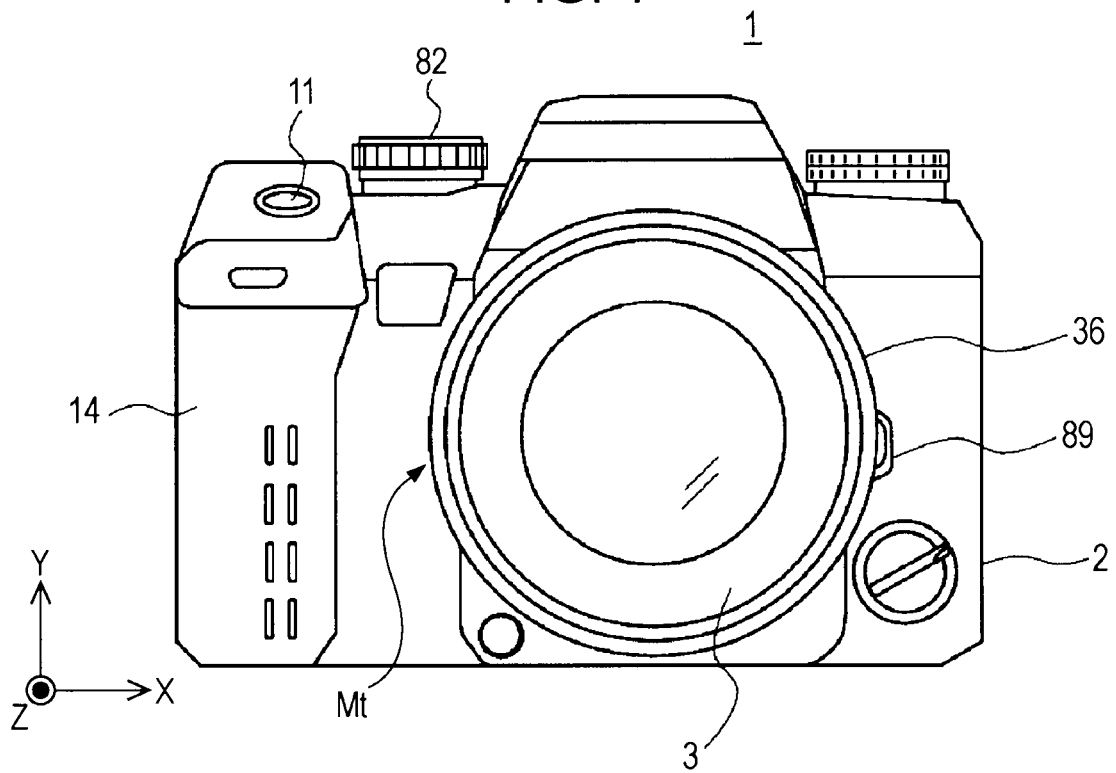
FIG. 1 is a front external view of an image pickup apparatus.
Figure 2:
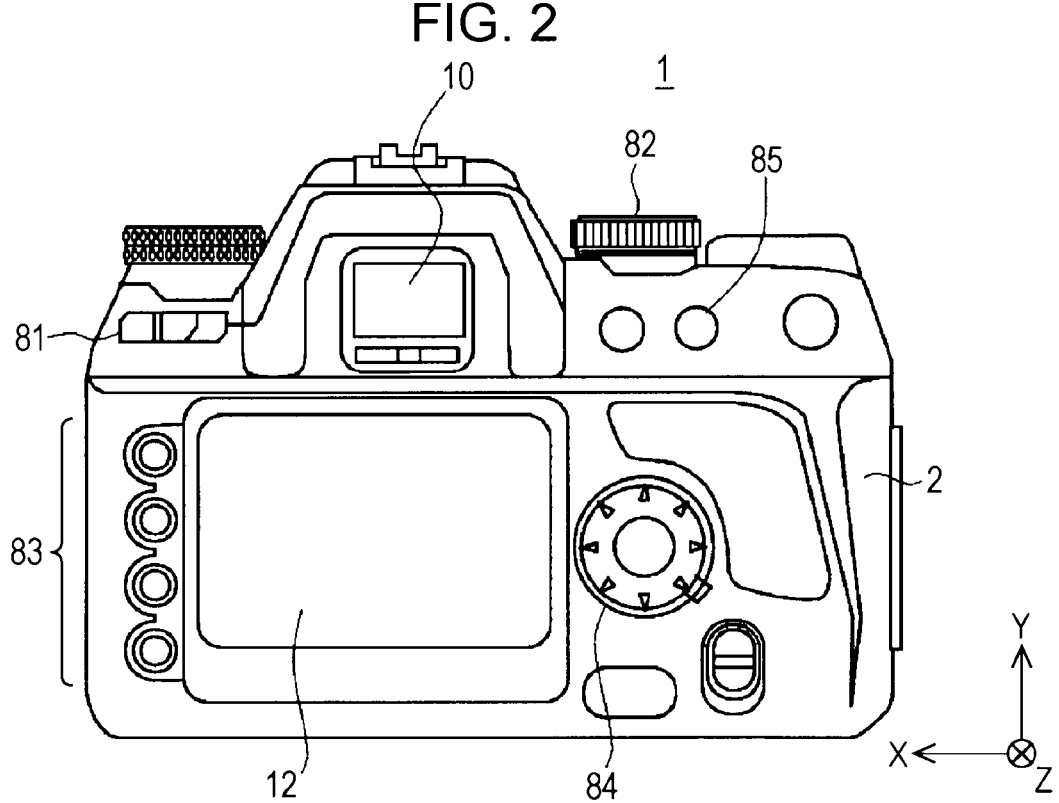
FIG. 2 is a rear external view of the image pickup apparatus.

FIGS. 1 and 2 each illustrate an external appearance of an image pickup apparatus 1 according to the embodiment of the present invention. More specifically, FIG. 1 is a front external view of the image pickup apparatus 1, and FIG. 2 is a rear external view of the image pickup apparatus 1. The image pickup apparatus 1 is a single-lens reflex digital camera with an interchangeable lens.

As illustrated in FIG. 1, the image pickup apparatus 1 includes a camera main unit (camera body) 2. An interchangeable imaging lens unit (i.e., an interchangeable lens) 3 is detachably attached to the camera body 2.

The imaging lens unit 3 includes, as main components, a barrel 36, lens groups 37 (see FIG. 3), and an aperture, the lens groups 37 and the aperture being disposed inside the barrel 36. The lens groups 37 (imaging optical system) include, e.g., a focus lens which is movable in the direction of an optical axis for changing a focus position.

The camera body 2 includes a circular ring-shaped mount Mt, to which the imaging lens unit 3 is mounted, substantially at a center on the front side thereof, and a lock/unlock button 89 which is disposed near the circular ring-shaped mount Mt for attachment and detachment of the imaging lens unit 3.

Further, the camera body 2 includes a mode setting dial 82 disposed on an upper left portion thereof as viewed from the front. By operating the mode setting dial 82, a user (or a photographer) can perform an operation to set (change over) various modes of the camera (including various shooting modes (such as a person shooting mode, a landscape shooting mode, and a full-automatic shooting mode), a reproducing mode to reproduce a taken image, and a communication mode for data transfer to and from an external device.

Still further, the camera body 2 includes a grip 14, which is gripped by the user, at a left end thereof as viewed from the front. A release button 11 is disposed above the grip 14 to instruct the start of exposure. A cell receiving room and a card receiving room are formed within the grip 14. A cell, e.g., a lithium ion cell, is removably received, as a camera power source, in the cell receiving room, and a memory card 90 (see FIG. 3) for recording image data of taken images is removably received in the card receiving room.

The release button 11 is a two-step detection button capable of detecting two states, i.e., a half-pressed state (S1 state) and a fully-pressed state (S2 state). When the release button 11 is half-pressed into the S1 state, a preparation operation (such as an AF control operation) is performed such that the camera is ready for taking a recorded still image of a subject (i.e., an image by the actual (real) shooting). When the release button 11 is further pressed into the S2 state, a main operation for taking the image by the actual shooting is performed (which includes a series of operations from an exposure operation for a subject image (optical image of the subject) by using an image pickup element 5 (described later) to predetermined image processing of an image signal obtained with the exposure operation). In other words, the image pickup apparatus 1 detects issuance of a shooting preparation command when the release button 11 is half-pressed into the S1 state, and detects issuance of a shooting command when the release button 11 is fully-pressed into the S2 state.

In FIG. 2, a finder window (eyepiece window) 10 is disposed at a top of the camera body 2 substantially at a center on the backside thereof. While viewing through the finder window 10, the user can visually confirm the optical image of the subject introduced through the imaging lens unit 3 and can determine a frame. Thus, the user can determine a frame by using an optical finder.

In the image pickup apparatus 1 according to this embodiment, the user can also determine a frame based on a live view image that is displayed on the backside monitor 12 (described later).

In FIG. 2, the backside monitor 12 is disposed on the backside of the camera body 2 substantially at a center. The backside monitor 12 is, for example, a color liquid crystal display (LCD). The backside monitor 12 is able, for example, to display a menu screen for allowing the user to set shooting conditions, etc., and to reproduce and display images in the reproducing mode, which have been taken and recorded in the memory card 90. Further, the backside monitor 12 is able to display, as live view images, a plurality of time-serial images (i.e., moving images) taken by the image pickup element 7 (described later).

A power switch (main switch) 81 is disposed at an upper left position relative to the backside monitor 12. The power switch 81 is a two-contact slide switch. Power is turned off when the switch is operated to slide to establish one contact at an "OFF" position on the left side, and power is turned on when the switch is operated to slide to establish the other contact at an "ON" position on the right side.

A direction select key 84 is disposed on the right side of the backside monitor 12. The direction select key 84 has a circular operating button which detects not only pressing operations thereof in four directions, i.e., upward, downward, leftward and rightward directions, but also pressing operations thereof in other four directions, i.e., right-upward, left-upward, right-downward and left-downward directions. The direction select key 84 can also detect a pressing operation of a push button at a center thereof in addition to the pressing operations in the above-described eight directions.

On the left side of the backside monitor 12, there is a setting button group 83 including a plurality of buttons to make, for example, setting on the menu screen and deletion of an image.

<2. Function Blocks>

Figure 3:
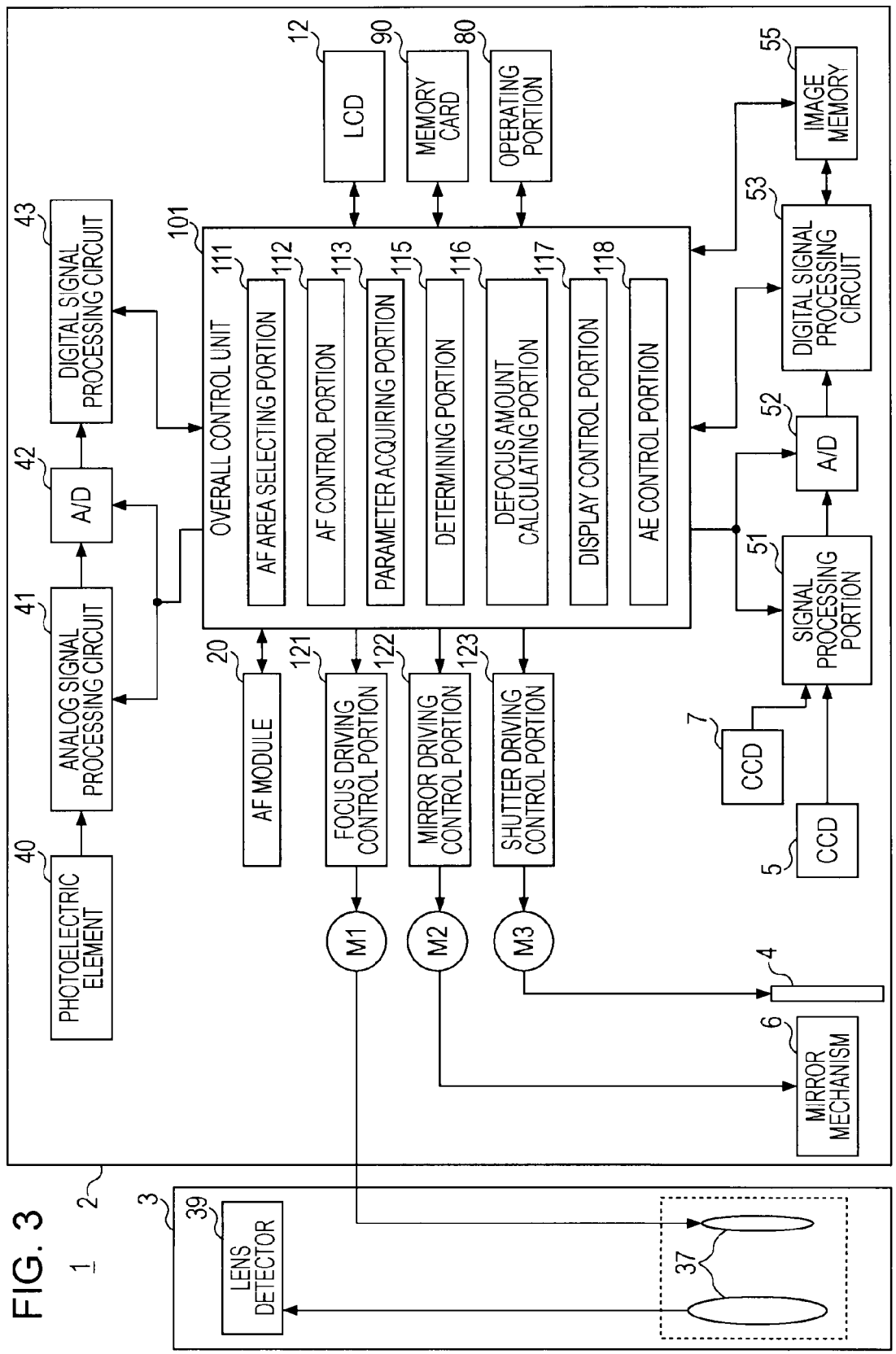
FIG. 3 is a block diagram illustrating a functional configuration of the image pickup apparatus.

Outline of the functions of the image pickup apparatus 1 will be described below with reference to FIG. 3. FIG. 3 is a block diagram illustrating a functional configuration of the image pickup apparatus 1.

As shown in FIG. 3, the image pickup apparatus 1 includes an AF module 20, an operating portion 80, an overall control unit 101, a focus driving control portion 121, a mirror driving control portion 122, a shutter driving control portion 123, and digital signal processing circuits 43 and 53, etc.

The operating portion 80 includes various buttons including the release button 11 (see FIG. 1), and various switches, etc. The overall control unit 101 performs various operations in response to input manipulations made by the user on the operating portion 80.

The overall control unit 101 cooperates with the AF module 20 and the focus driving control portion 121 to execute a focusing control for controlling the position of the focus lens. More specifically, the overall control unit 101 realizes an AF operation by using the focus driving control portion 121 depending on an in-focus state of the subject, which is detected by the AF module 20. The AF module 20 can detect the in-focus state of the subject based on an in-focus state detecting method of phase difference type, for example, by employing light that enters through a mirror mechanism 6. Also, the AF module 20 detects respective in-focus states of subjects corresponding to a plurality of AF areas FR1 to FR11 (see FIG. 12), which are formed within an image. Further, the AF module 20 can detect respective in-focus lens positions for the plurality of AF areas (i.e., respective lens position at which the subjects corresponding to the plurality of AF areas are brought into the in-focus states). By using the AF module 20 of the phase difference type, particularly, the in-focus lens positions can be determined at a very high speed.

The overall control unit 101 is made of a microcomputer including, as main components, a CPU, a memory, and a ROM (e.g., an EEPROM). The overall control unit 101 reads a program stored in the ROM and executes the program with the CPU, thus implementing various functions.

Looking at the details, the overall control unit 101 includes an AF area selecting portion 111, an AF control portion 112, a parameter acquiring portion 113, a determining portion 115, a defocus amount calculating portion 116, a display control portion 117, etc.

The parameter acquiring portion 113 acquires parameters for detecting a scene change based on a signal produced by the image pickup element 7, etc. (i.e., an image signal, etc.). More specifically, the parameter acquiring portion 113 acquires parameter values regarding brightness, contrast and tint, as described later in detail.

The determining portion 115 determines the presence or the absence of a scene change based on the parameters (parameter values) acquired by the parameter acquiring portion 113.

The defocus amount calculating portion 116 calculates a defocus amount between two among the plurality of AF areas. More specifically, the defocus amount calculating portion 116 calculates a defocus amount that is provided as a difference between a position of the focus lens at which the subject corresponding to one AF area is brought into the in-focus state and a position of the focus lens at which the subject corresponding to another AF area is brought into the in-focus state.

The AF area selecting portion 111 selects a focusing target AF area from among the plurality of AF areas. For example, the AF area selecting portion 111 selects in principle, as the focusing target AF area, one among the plurality of AF areas in which the subject nearest (closest) to the camera is present. Note that, as described later, the AF area selecting portion 111 changes a method of selecting the focusing target AF area depending on, e.g., the presence or the absence of a scene change.

The AF control portion (focusing control portion) 112 executes focusing control by using focusing information with respect to the selected AF area (i.e., the AF area which has been selected as the focusing target AF area by the AF area selecting portion 111). The focusing information is provided, for example, as the in-focus lens position detected by the AF module 20.

The focus driving control portion 121 implements the focusing control operation in cooperation with the overall control unit 101. More specifically, the focus driving control portion 121 moves the focus lens, which is included in the lens group 37 of the imaging lens unit 3, by producing a control signal based on a signal input from the overall control unit 101 and by driving a motor M1. Further, the position of the focus lens is detected by a lens position detector 39 in the imaging lens unit 3, and data representing the position of the focus lens is sent to the overall control unit 101. Thus, the focus driving control portion 121 controls, for example, the movement of the focus lens in the direction of an optical axis.

The display control portion 117 displays the selected AF area at a predetermined position on a screen of the backside monitor 12 or in a visual field of the optical finder.

Further, the overall control unit 101 controls an operation of implementing the live view function (i.e., the function of successively displaying time-serial images of subject(s) on, e.g., a liquid crystal display portion; namely the function of displaying images of subject(s) on, e.g., the liquid crystal display portion in moving-image fashion). The display control portion 117 controls, for example, an operation of displaying, on the backside monitor 12, live view images each of which contains one or more AF areas superimposed thereon.

Moreover, the overall control unit 101 includes an AE control portion 118 for executing an automatic exposure control operation (AE operation). The AE control portion 118 executes the AE operation based on the brightness of a region corresponding to the selected AF area which has been selected from among the plurality of AF areas. More specifically, the AE control portion 118 selects, from among a plurality of divided partial regions in a photometric element 40 (described later), one region corresponding to the selected AF area and executes the AE operation based on the brightness of the selected region.

The mirror driving control portion 122 controls switching between a state in which the mirror mechanism 6 is retracted from an optical path (i.e., a mirror-up state) and a state in which the mirror mechanism 6 is located to shut off the optical path (i.e., a mirror-down state). The mirror driving control portion 122 switches over the mirror-up state and the mirror-down state by producing a control signal based on a signal input from the overall control unit 101 and by driving a motor M2.

The shutter driving control portion 123 controls opening/closing of a shutter 4 by producing a control signal based on a signal input from the overall control unit 101 and by driving a motor M3.

The image pickup element (also called here a CCD sensor or more simply a CCD) 5 is a light receiving element for converting the optical image of the subject (subject image) introduced through the imaging lens unit 3 to an electrical signal with a photoelectric action, and it produces an image signal of an image taken by actual shooting (i.e., an image signal to be recorded). The image pickup element 5 can also be expressed as an image pickup element for capturing a recorded image.

In response to a driving control signal (including an start-of-accumulation signal and an end-of-accumulation signal) from the overall control unit 101, the image pickup element 5 performs exposure of the subject image (i.e., charge accumulation through photoelectric conversion), which is focused on a light receiving plane, and then produces an image signal for the relevant subject image. Further, in response to a read control signal from the overall control unit 101, the image pickup element 5 outputs the image signal to a signal control portion 51.

After the image signal obtained by the image pickup element 5 has been subjected to predetermined analog signal processing by a signal processing portion 51, the image signal resulting from the analog signal processing is converted to digital image data (image data) by an A/D conversion circuit 52. The image data is input to a digital signal processing circuit 53.

The digital signal processing circuit 53 executes digital signal processing on the image data, which is input from the A/D conversion circuit 52, to produce image data of the taken image. The digital signal processing circuit 53 includes a black level correction circuit, a white balance (WB) circuit, a γ correction circuit, etc., and executes various types of digital signal processing. The image signal (image data) processed by the digital signal processing circuit 53 is stored in an image memory 55. The image memory 55 is an image memory which temporarily stores the produced image data and which can be accessed at a high speed. The image memory 55 has a capacity enough to store the image data of plural frames.

In the actual shooting, the image data temporarily stored in the image memory 55 is stored in the memory card 90 after being subjected to appropriate image processing (such as a compression process) in the overall control unit 101.

Further, the image temporarily stored in the image memory 55 is displayed on the backside monitor 12 under control of the display control portion 117 in the overall control unit 101. This realizes, for example, confirmation-purpose display (i.e., after-view display) to display an after-view image, i.e., an image for confirming the actual shooting, in response to a shooting command, and reproducing-purpose display to reproduce an image having been taken.

The image pickup apparatus 1 further includes an image pickup element 7 (see FIG. 4 as well) in addition to the image pickup element 5. The image pickup element 7 serves as an image pickup element for capturing the so-called live view images (i.e., moving images). The image pickup element 7 also has the same construction as the image pickup element 5. It is, however, to be noted that the image pickup element 7 is necessary to have resolution just enough to produce an image signal for live view (i.e., moving images) and is usually made up of pixels in smaller number than the image pickup element 5.

The image signal captured by the image pickup element 7 is also subjected to processing by an A/D conversion circuit 52 and a digital signal processing circuit 53, for example, in a similar manner to the processing executed on the image signal captured by the image pickup element 5, thus producing image data. A plurality of time-serial images successively captured by the image pickup element 7 are displayed on the backside monitor 12 in sequence under control of the display control portion 117. As a result, display in moving-image fashion (i.e., live view display) allowing the user to determine a frame is realized.

In addition, the image pickup apparatus 1 includes the photometry element 40 for receiving light of (the whole or a part of) the subject image introduced through the imaging lens unit 3. The photometry element 40 executes photoelectric conversion of the subject image to measure the brightness (luminance) of the subject image. More specifically, the photometry element 40 converts the brightness of the subject image to an electrical signal having a corresponding level through the photoelectric conversion. Further, a signal obtained by the photometry element 40 is subjected to signal processing through an analog signal processing circuit 41, an A/D conversion circuit 42, a digital signal processing circuit 43, etc.

<3. Outline of Image-Taking Operation>

The image-taking operation, including the framing operation, of the image pickup apparatus 1 will be described below. In the image pickup apparatus 1, as described above, the user can perform framing by using not only the optical finder (also called an optical view finder (OVF)), which includes a finder optical system, etc., but also the live view images displayed on the backside monitor 12. The live view images can also be expressed as time-serial images of subject(s), which are successively displayed on the display portion (e.g., the backside monitor 12); namely, images of subject(s) displayed in moving-image fashion. The finder function realized with the image pickup element 7 and the backside monitor 12 is also called an electronic view finder (EVF) because the finder function visualizes the optical image of the subject after conversion to electronic data.

Figure 4:
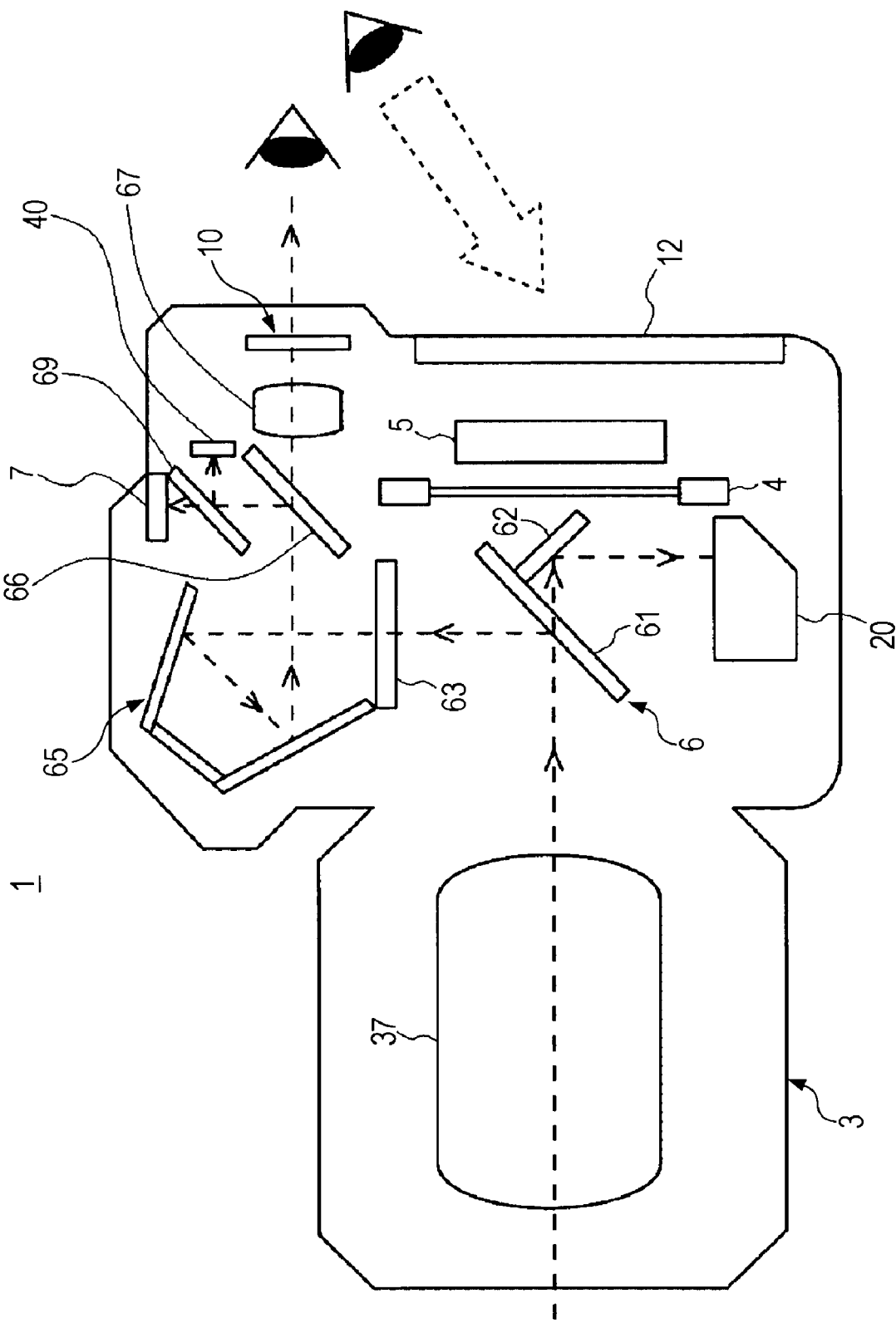
FIG. 4 is a sectional view of the image pickup apparatus (in a state of framing operation)
Figure 5:
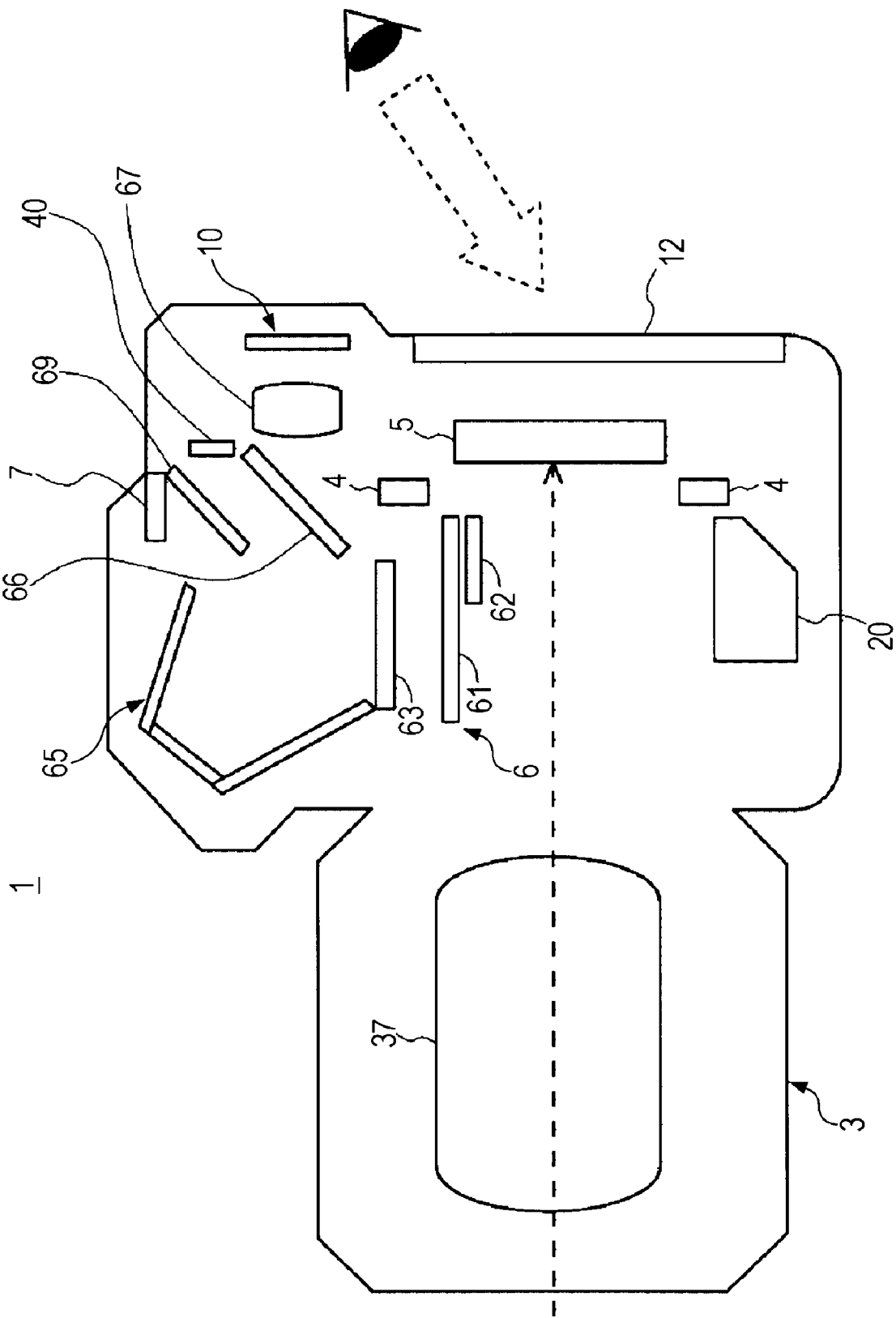
FIG. 5 is a sectional view of the image pickup apparatus (in a state of actual (real) shooting)

FIGS. 4 and 5 are each a sectional view of the image pickup apparatus 1. FIG. 4 illustrates a state of the framing operation, and FIG. 5 illustrates a state in which an image is taken by the actual (real) shooting (i.e., during exposure).

As shown in FIG. 4 and so on, the mirror mechanism 6 is disposed on an optical path extending from the imaging lens unit 3 to the image pickup element 5 (i.e., an imaging optical path). The mirror mechanism 6 includes a main mirror 61 (main reflecting surface) which reflects light incoming from the imaging optical system upwards. The main mirror 61 is formed as, e.g., a half mirror in a part or the whole thereof such that the light incoming from the imaging optical system partly passes through the main mirror 61. Further, the mirror mechanism 6 includes a sub-mirror 62 (sub-reflecting surface) which reflects light having passed through the main mirror 61 downwards. The light reflected downwards by the sub-mirror 62 is guided to enter the AF module 20 and is utilized for the AF operation of the phase difference type.

Until the release button 11 is brought into the fully-pressed state S2 in the shooting mode, i.e., during the framing operation, the mirror mechanism 6 is positioned in the mirror-down state (FIG. 4). At that time, the subject image introduced through the imaging lens unit 3 is reflected upwards by the main mirror 61 and enters, as a light beam for observation, a penta-mirror 65. The framing operation is performed in such a state.

On the other hand, when the release button 11 is brought into the fully-pressed state S2, the mirror mechanism 6 is driven into the mirror-up state and the exposure operation is started (see FIG. 5). In practice, as shown in FIG. 5, the mirror mechanism 6 is retracted from the imaging optical path during the exposure. More specifically, the main mirror 61 and the sub-mirror 62 are retracted upwards to a position not interfering with the light (subject image) from the imaging optical system so that the light incoming from the imaging lens unit 3 advances without being reflected by the main mirror 61 and reaches the image pickup element 5 during a period in which the shutter 4 is opened. The image pickup element 5 produces an image signal of the subject based on the received light beam through photoelectric conversion. Thus, the light beam from the subject (subject image) passes through the imaging lens unit 3 and is introduced to the image pickup element 5, whereby a taken image of the subject (taken image data) is obtained.

<4. Framing Operation>

The framing operation will be described in more detail below.

As shown in FIG. 4, when the main mirror 61 and the sub-mirror 62 of the mirror mechanism 6 are disposed on the optical path for the subject image incoming from the imaging lens unit 3, the subject image is introduced to the finder window 10 through the main mirror 61, the penta-mirror 65, a half mirror 66, and the eyepiece lens 67. In other words, the finder optical system including the main mirror 61, the penta-mirror 65, and the eyepiece lens 67 can introduce the light beam having been introduced from the imaging optical system and reflected by the main mirror 61, i.e., the light beam for observation, to the finder window 10.

More specifically, the light incoming from the imaging lens unit 3 is reflected by the main mirror 61 to change its propagation path upwards, and passes through a focal plane plate 63 after being focused at the focal plane plate 63. The light having passed through the focal plane plate 63 enters the penta-mirror 65 for change its propagation path and then passes through the half mirror 66 and the eyepiece lens 67. Finally, the light advances toward the finder window 10. In such a manner, the subject image having passed through the finder window 10 reaches the eye of the user (observer) for visual confirmation. Thus, the user can confirm the subject image by looking at the finder window 10.

Further, a part of the light having been reflected by the penta-mirror 65 and having reached the half mirror 66 is reflected by a reflecting surface of the half mirror 66 to change its propagation path upwards, followed by reaching a half mirror 69.

A part of the light having reached the half mirror 69 passes through the half mirror 69 and reaches the image pickup element 7 so as to be refocused on an image pickup plane of the image pickup element 7.

The image pickup element 7 produces the live view image based on the subject image having reached the image pickup element 7. More specifically, the image pickup element 7 successively produces a plurality of images at small time intervals (e.g., 1/60 sec). The time-serial taken images are displayed on the backside monitor 12 in sequence. As a result, the user can visually confirm moving images (live view images) displayed on the backside monitor 12 and can determine a frame (i.e., perform framing) while viewing the moving images.

The remaining part of the light having reached the half mirror 69 is reflected by a reflecting surface of the half mirror 69 to change its propagation path rightwards and reaches the photometric element 40. The photometric element 40 measures the brightness of the subject based on the subject image having reached the photometric element 40.

Further, the light having passed through the main mirror 61 is reflected by the sub-mirror 62 to change its propagation path downwards and enters the AF module 20. The AF module 20, the focus driving control portion 121, etc. cooperate so as to implement the AF operation by employing the light that has been introduced through the main mirror 61 and the sub-mirror 62.

<5. Details of Image-Taking Operation>

Figure 6:
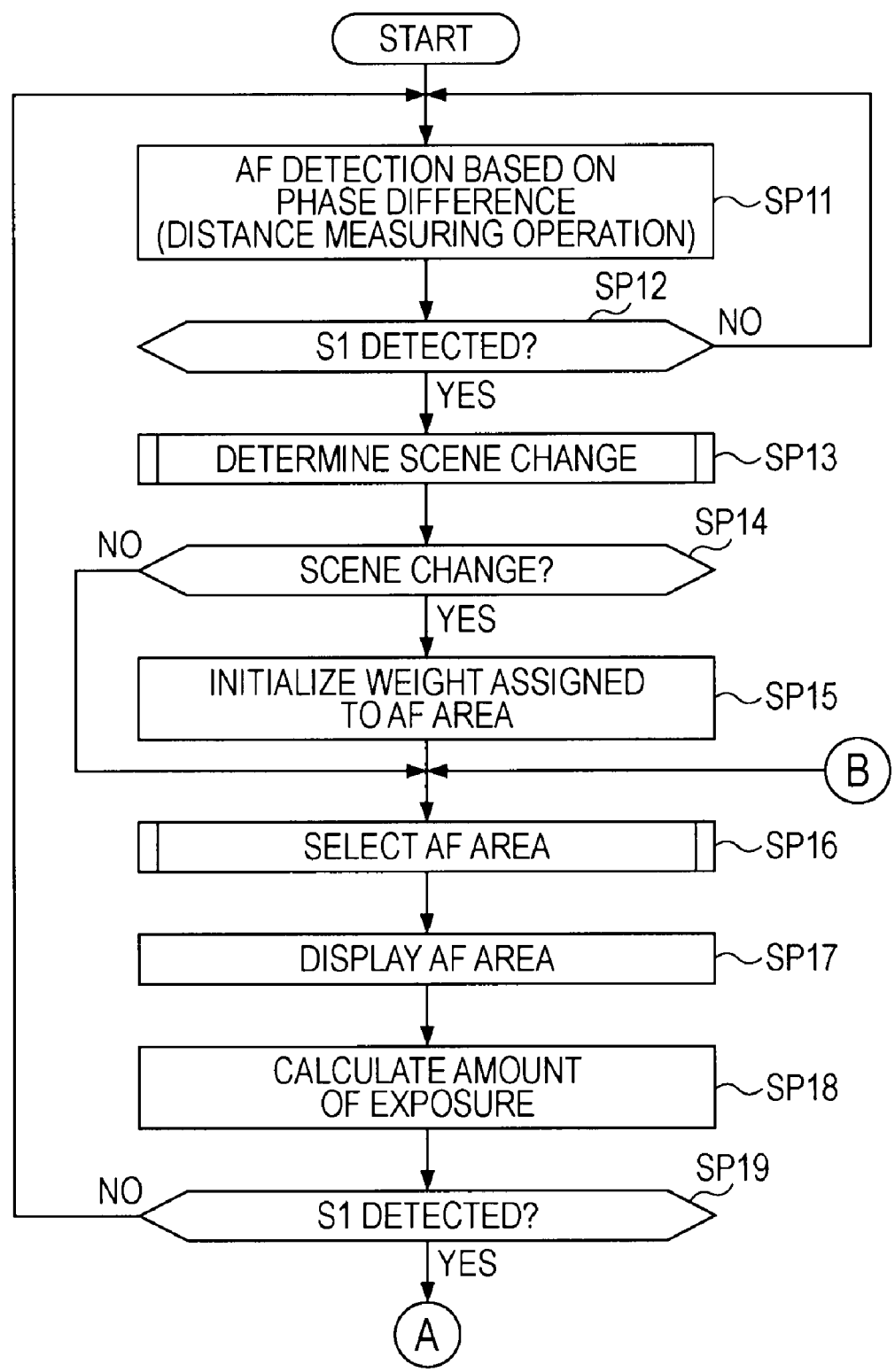
FIG. 6 is a flowchart illustrating the operation of the image pickup apparatus.
Figure 7:
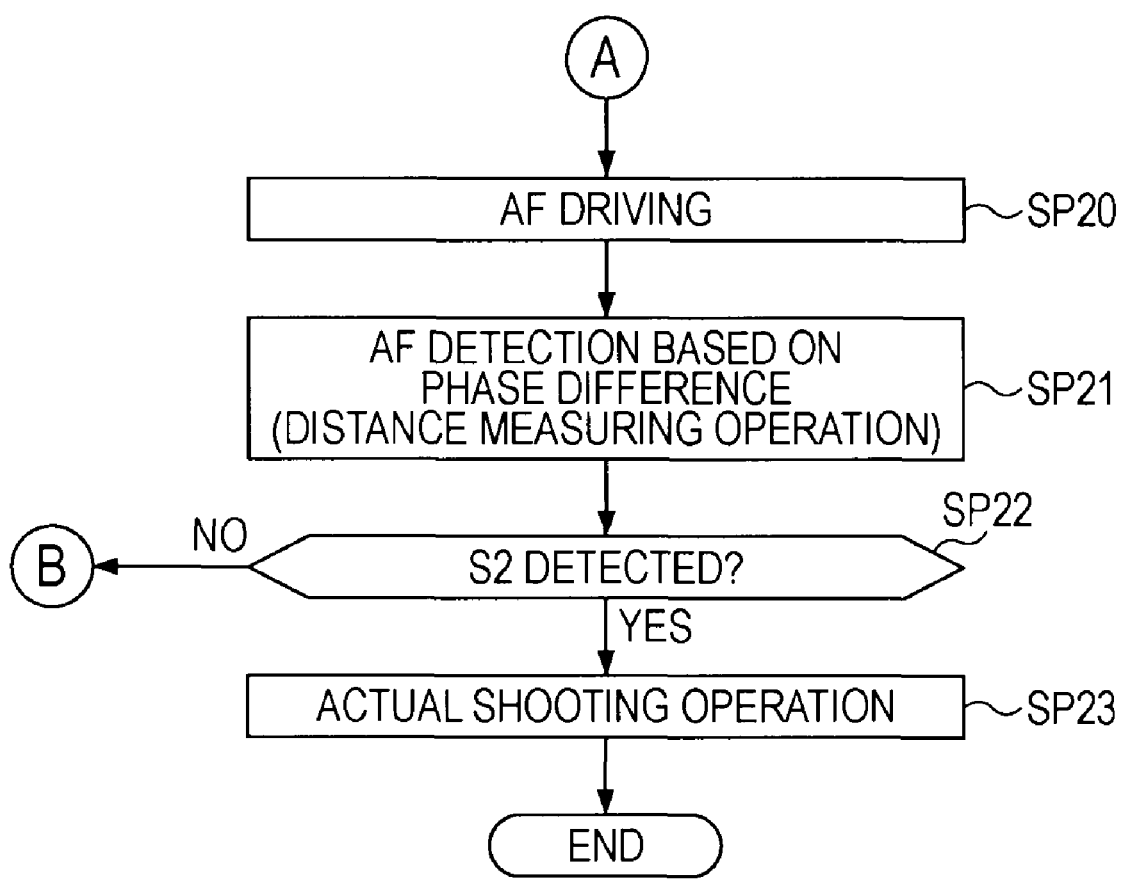
FIG. 7 is a flowchart illustrating the operation of the image pickup apparatus.
Figure 8:
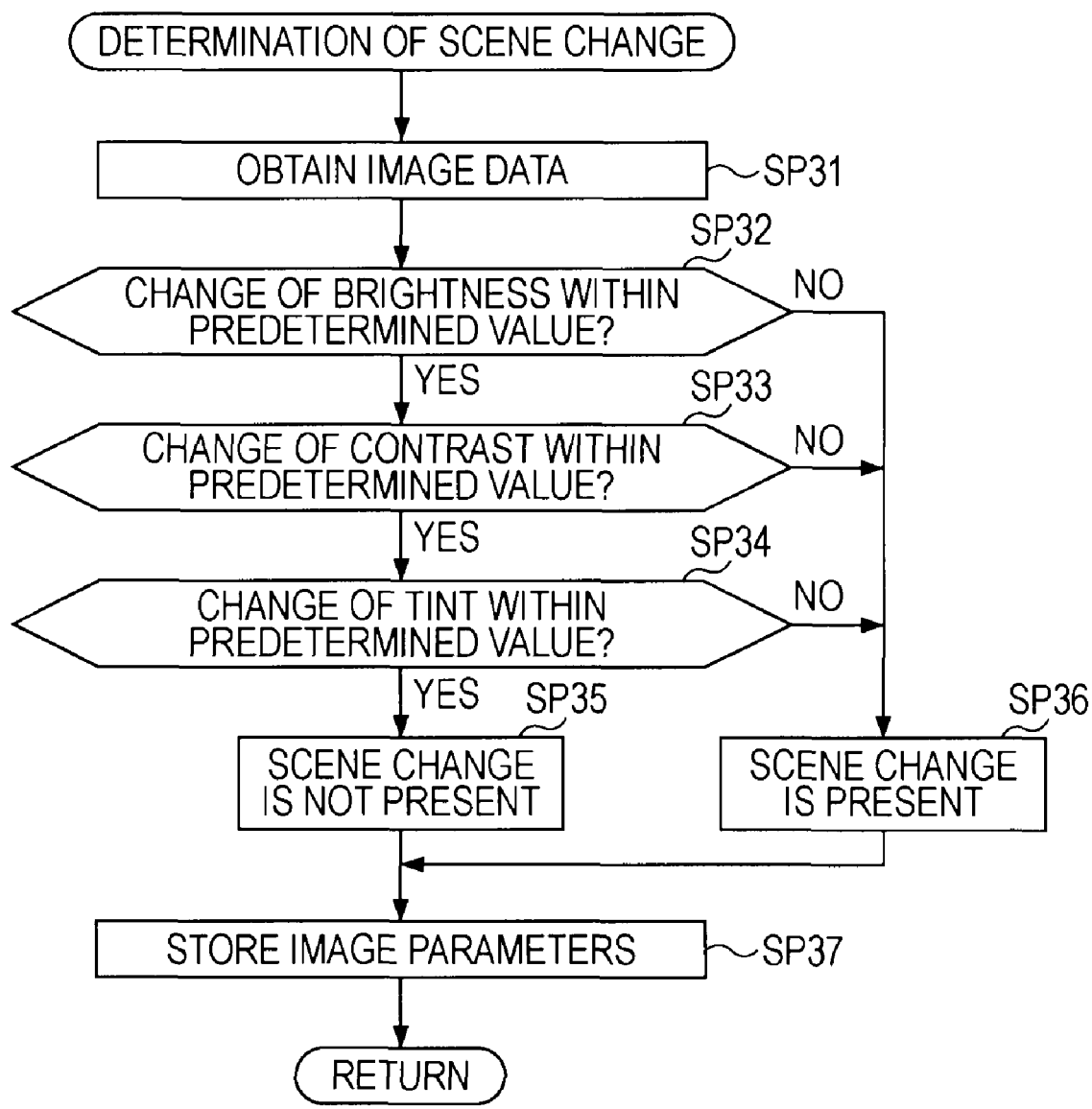
FIG. 8 is a flowchart illustrating one part of the operation in detail.
Figure 9:
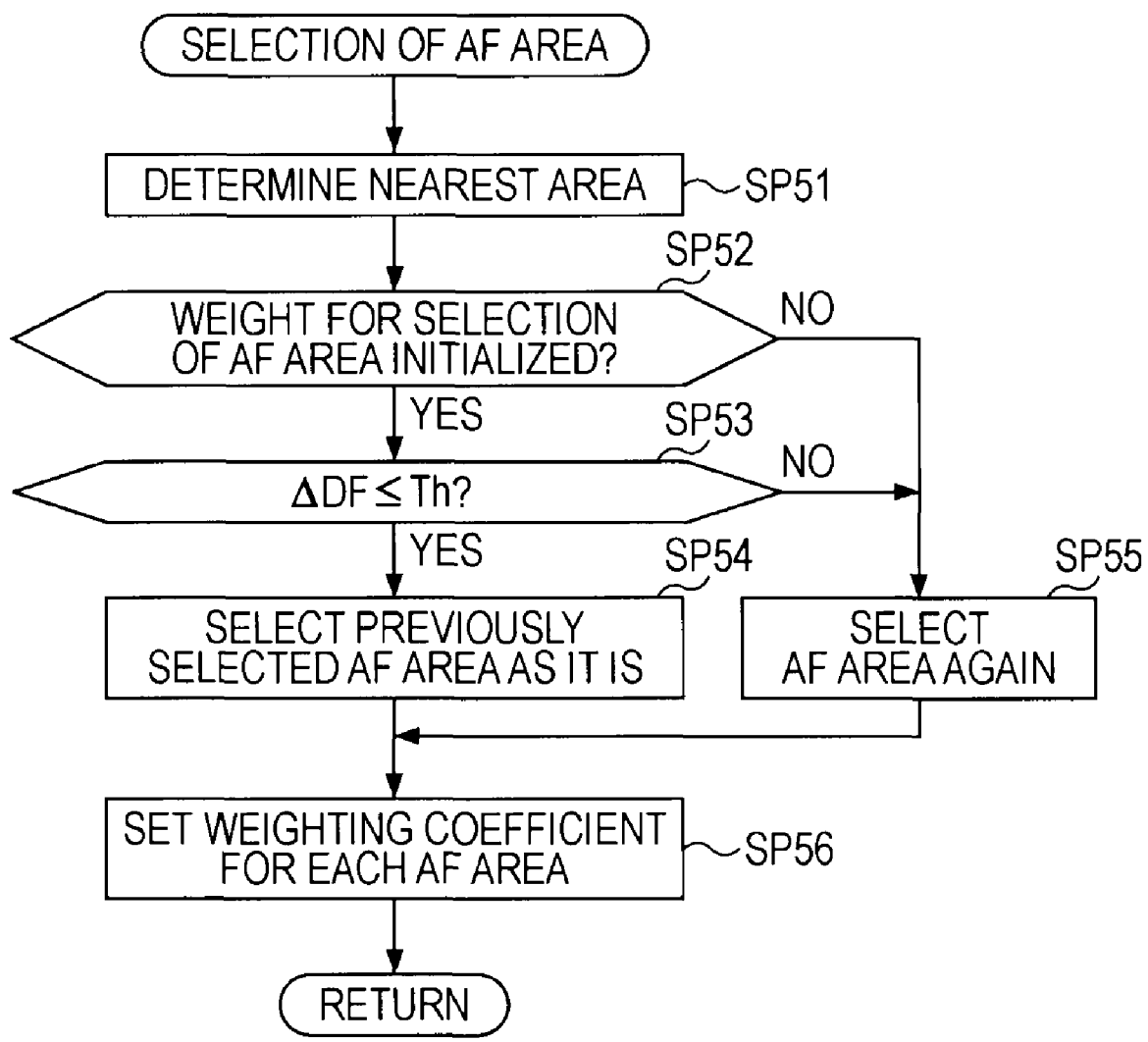
FIG. 9 is a flowchart illustrating another part of the operation in detail.

Details of the image-taking operation in the image pickup apparatus 1 will be described below with reference to flowcharts of FIGS. 6 to 9. FIGS. 6 and 7 are flowcharts illustrating main operations. FIGS. 8 and 9 are flowcharts illustrating detailed operations of respective parts of the main operation illustrated in FIG. 6.

As shown in FIG. 6, until the pressing of the release button 11 into the half-pressed state S1 is detected, the distance measuring operation by the phase-difference AF sensor is repeatedly executed (step SP11). In step SP11, the distance measuring operation (specifically, the operation of determining the position of the focus lens where the subject corresponding to each AF area is brought into the in-focus state) is executed for respective targets in all the AF areas FR1 to FR11 (see FIG. 12). Stated another way, in step SP11, the "distance measuring operation" is executed, but the "driving operation" of the focus lens is not yet executed. As described later, after the release button 11 has been pressed into the half-pressed state S1, the focus lens is actually driven (step SP20).

The following description is made, by way of example, of the case that one of the plural AF areas FR1 to FR11 is selected as the focusing target AF area.

If the pressing of the release button 11 into the half-pressed state S1 is detected, the processing advances from step SP12 to SP13.

In step SP13, the presence or the absence of a scene change is determined.

FIG. 8 illustrates the detailed operation in step SP13.

In step SP31 (FIG. 8), the image signal (image data) is produced by the image pickup element 7, etc. More specifically, image data G20 is obtained at a time T20. The time T20 represents a time at which the release button 11 is pressed into the half-pressed state S1 by the current operation of the release button 11 (step SP12).

Further, it is here assumed that image data G10 at a time T10 before the time T20 has also been produced and obtained in advance. The time T10 represents a time at which the release button 11 has been pressed into the half-pressed state S1 by the previous operation of the release button 11 (T10<T20). The time T20 may be, for example, several seconds to several tens seconds later from the time T10. The image (data) G10 represents an image that has been obtained in step SP31 in the previous processing routine in response to the previous operation of the release button 11. The image (data) G20 represents an image that is obtained in step SP31 in the current processing routine in response to the current operation of the release button 11.

Thus, a situation is assumed here in which, after the state of issuing a shooting preparation command with the previous half-pressing operation of the release button 11 has been temporarily released, a shooting preparation command with the current half-pressing operation of the release button 11 is issued again.

Exactly speaking, there is a time lag from the pressing of the release button 11 into the half-pressed state S1 to the production of the image by the image pickup element 7. In this specification, however, the description is made on an assumption that the time lag is not taken into consideration and the taken image is produced by the image pickup element 7 at the same time as when the release button 11 is pressed into the half-pressed state S1. For example, the taken image G20 is regarded as being produced at the time T20 by the image pickup element 7, etc. in response to the current half-pressing operation of the release button 11. Similarly, the taken image G10 is regarded as having been produced at the time T10 by the image pickup element 7, etc. in response to the previous half-pressing operation of the release button 11.

Further, this embodiment is described, by way of example, in connection with the case that parameters for detecting a scene change are obtained by using the image signals (i.e., the image G10 and the image G20) that have been produced at the times T10 and T20 by the image pickup element 7.

In subsequent steps SP32 to SP36, it is determined whether there is a scene change between the image G10 taken at the time T10 and the image G20 taken at the time T20. In other words, the presence or the absence of a scene change is determined between a scene taken at the time T10 and a scene taken at the time T20.

Herein, the presence or the absence of a scene change is determined by using three parameters, i.e., brightness, contrast and tint. More specifically, parameter values representing the brightness, the contrast and the tint (i.e., values of the three parameters) for the taken image G10 are calculated as scene determination parameters. Similarly, parameter values representing the brightness, the contrast and the tint (i.e., values of the three parameters) for the taken image G20 are also calculated as scene determination parameters.

In step SP32, the presence or the absence of a scene change between the images G10 and G20 is determined by using the "brightness".

More specifically, the overall brightness of the image G10 and the overall brightness of the image G20 are compared with each other. If the difference between respective levels of the overall brightness is larger than a predetermined value, the processing advances to step SP36 in which the scene change is determined to be present.

On the other hand, if the difference between respective levels of the overall brightness is not larger than the predetermined value, the scene change is determined to be not present as the result of a determination process on the basis of "brightness", and the processing advances to step SP33.

In step SP33, the presence or the absence of a scene change between the images G10 and G20 is determined by using the "contrast".

Figure 10:
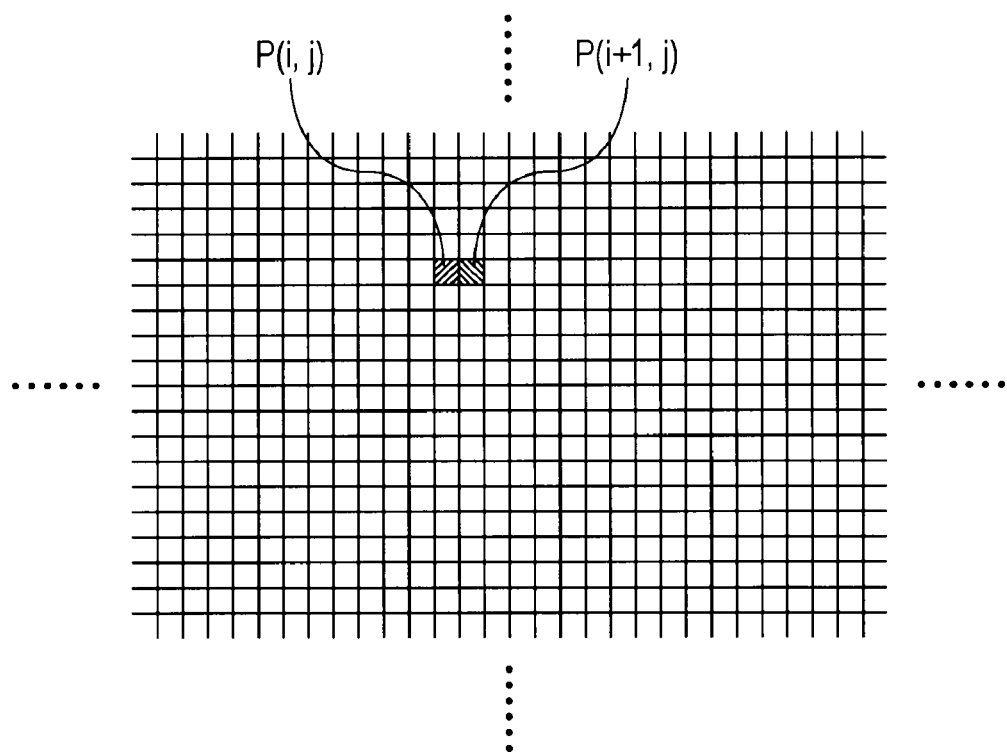
FIG. 10 illustrates a target (interesting) pixel and an adjacent pixel in a process of calculating a contrast value.

More specifically, the contrast value of the image G10 and the contrast value of the image G20 are compared with each other. If the difference between both the contrast values is larger than a predetermined value, the processing advances to step SP36 in which the scene change is determined to be present. For example, as illustrated in FIG. 10, the contrast value is obtained as a value resulting from summing up an absolute value of the difference (P(i+1, j)−P(i,j)) between a pixel value P(i,j) of a target (interesting) pixel and a pixel value P(i+1,j) of an adjacent target pixel for a plurality of pixels (e.g., all pixels).

On the other hand, if the difference between both the contrast values is not larger than the predetermined value, the scene change is determined to be not present as the result of a determination process on the basis of "contrast", and the processing advances to step SP34.

In step SP34, the presence or the absence of a scene change between the images G10 and G20 is determined by using the "tint (hue)".

More specifically, the tint of the image G10 and the tint of the image G20 are compared with each other. The tint of the image G10 is obtained, for example, as a ratio between two among a total sum Sr of R component values of a plurality of pixels (e.g., all pixels) contained in the relevant image, a total sum Sg of G component values thereof, and a total sum Sb of B component values thereof. The tint of the image G20 is also obtained as a similar ratio.

If the ratio between two among the total sums of the respective color component values (R, G and B) for each of the images G10 and G20 is within a predetermined range, it is determined that the tint of the image G10 is comparable to the tint of the image G20 and there is no scene change.

More specifically, if the difference in a ratio Rrg between both the images G10 and G20 is larger than a predetermined value, or if the difference in a ratio Rbg between both the images G10 and G20 is larger than a predetermined value, the processing advances to step SP36. In step SP36, the scene change is determined to be present. Herein, the ratio Rrg (=Sr/Sg) represents a ratio of the value Sr to the value Sg in each image, and the ratio Rbg (=Sb/Sg) represents a ratio of the value Sb to the value Sg in each image.

On the other hand, if the difference in a ratio Rrg between both the images G10 and G20 is not larger than the predetermined value, or if the difference in a ratio Rbg between both the images G10 and G20 is not larger than the predetermined value, the scene change is determined to be not present as the result of a determination process on the basis of "tint", and the processing advances to step SP35.

Figure 11:
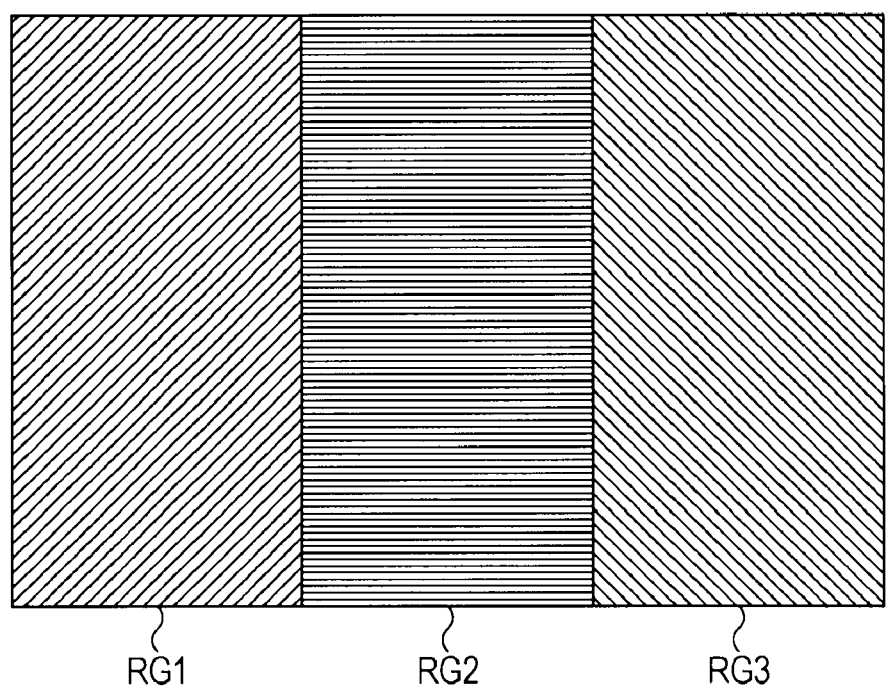
FIG. 11 illustrates a situation where a tint is determined for each of divided partial regions.

While the embodiment is described here as using the total sums Sr, Sg and Sb of the respective color component values of all the pixels in each of the images G10 and G20, the manner of determining the presence or the absence of a tint change is not limited to the described one. For example, a ratio between two of the respective color component values for a part of all the pixels may be compared between both the images G10 and G20. Alternatively, as illustrated in FIG. 11, an image may be divided into a plurality (three in FIG. 11) of partial regions GR1, GR2 and GR3, and the tint of each divided partial region may be determined. More specifically, the processing may be modified so as to determine the presence or the absence of a tint change for each of the divided partial regions and to determine that the scene change is not present, if there is no tint change in all the divided partial regions.

In step SP35, the scene change is determined to be not present.

Further, in next step SP37, the current parameters used in the determination processing in steps SP32 to SP36 are stored.

As described above, a parameter PR(T20) regarding the image signal obtained at the current time T20 is compared with a parameter PR(T10) regarding the image signal obtained at the previous time T10, thus determining the presence or the absence of a scene change.

The description is continued by referring to FIG. 6 again.

In step SP14, the processing is branched depending on the determination result as to the presence or the absence of a scene change. If it is determined that the scene change is present, the processing advances to step SP15 in which weight assigned to the AF area is initialized. On the other hand, if it is determined that the scene change is not present, the processing advances to step SP16 without changing the weight assigned to the AF area (i.e., while the weight assigned to the AF area is maintained as it is).

Herein, a weighting coefficient of 100% or 0% is set as the "weight" assigned to each AF area for weighting thereof. For example, the weighting coefficient of "100%" is set only for one (e.g., the AF area FR1) selected from among the eleven AF areas FR1 to FR11, and the weighting coefficient of "0%" is set for the remaining ten AF areas (e.g., FR2 to FR 11). As a result, a state of attaching top priority to the selected AF area FR1 is expressed.

If the scene change is present, the weighting coefficients for the AF areas FR1 to FR11 are each set to "0%" in step SP15. In other words, the weighting coefficients for all the AF areas FR1 to FR11 are initialized. On the other hand, if the scene change is not present, the weighting coefficients previously set for the AF areas FR1 to FR11 are maintained as they are. For example, when the AF area FR1 has been selected as the selected AF area in response to the previous operation of the release button 11, the weighting coefficient of "100%" is set only for one AF area FR1, and the weighting coefficient of "0%" is set for the remaining ten AF areas FR2 to FR 11.

In next step SP16, an AF area selection process is executed to select one AF area which is to be set as a focusing target AF area. Stated another way, step SP16 determines which one of the AF areas is to be handled as the focusing target AF area.

FIG. 9 is a flowchart illustrating the detailed operation in step SP16. As illustrated in FIG. 9, one AF area in which the subject corresponding to the one AF area is positioned nearest to the image pickup apparatus 1 (also called the "nearest AF area") is first determined from among a plurality of AF areas in step SP51. In other words, the "nearest AF area" is determined as a "candidate" for a new focusing target AF area from among the plurality of AF areas in accordance with a predetermined criterion (e.g., the "nearest priority criterion"). Then, in step SP52, it is determined whether the weighting coefficients for the AF areas are in the initialized state (i.e., the state in which the weighting coefficients are not set by the "weighting"). The following processing is branched based on the determination result.

For example, immediately after the weighting coefficients for all the AF areas FR1 to FR11 have been set to "0%" in step SP15, it is determined in step SP52 that the weighting coefficients for the AF areas are in the initialized state.

If it is determined in step SP52 that the weighting coefficients for the AF areas are in the initialized state, the processing advances to step SP55. In step SP55, the "nearest" AF area" (e.g., FR2) is selected as the focusing target AF area. Thereafter, the processing advances to step SP56.

On the other hand, for example, when the weighting coefficient of "100%" is set for one AF area FR1 and the weighting coefficient of "0%" is set for the remaining ten AF areas FR2 to FR11, this is determined as indicating that the weighting coefficients are set by the "weighting". Note that because the AF area for which the weighting coefficient of "100%" is set is the AF area selected as the focusing target AF area, the relevant AF area is also called the "selected AF area".

If it is determined in step SP52 that the weight coefficients are set by the "weighting", the processing advances to step SP53.

In step SP53, a defocus amount ΔDF, i.e., a difference (exactly speaking, an absolute value of the difference) between a focus lens position at which the subject in the "nearest AF area" (e.g., the AF area FR2) is brought into the in-focus state and a focus lens position at which the subject in the "selected AF area" (e.g., the AF area FR1) is brought into the in-focus state, is calculated. Then, whether the defocus amount ΔDF is not larger than a predetermined threshold Th is determined. Stated another way, in step SP53, it is determined whether a relative positional shift between two of the plural subjects in the direction away from the camera is smaller than a predetermined extent. The predetermined threshold Th is set to, e.g., 100 μm that is provided by a value of the focal depth itself or a value resulting from multiplying the focal depth by a predetermined coefficient α (>1) (for example, α=1.5).

If the defocus amount ΔDF is larger than the threshold Th (namely, if the relative positional shift between two of the plural subjects is larger than the predetermined extent), the processing advances to step SP55. In step SP55, the "nearest AF area" (e.g., FR2) is selected as the focusing target AF area. Thereafter, the processing advances to step SP56.

On the other hand, if the defocus amount ΔDF is not larger than the threshold Th (namely, if the relative positional shift between two of the plural subjects is not larger than the predetermined extent), the processing advances to step SP54. In step SP54, the "selected AF area" (e.g., FR1) is continuously selected as the focusing target AF area. For example, the "selected AF area" (e.g., FR1) having been selected at a first timing (more exactly speaking, at the first time T10 or immediately after the first time T10) is continuously selected as the focusing target AF area even at a second timing (more exactly speaking, at the second time T20 or immediately after the second time T20). Thereafter, the processing advances to step SP56.

The term "timing" used in this specification is not limited only to one point on the time base (i.e., a "certain momentary time" in the strict meaning), and the term "timing" implies a certain period (time span) on the time base. For example, the first timing includes not only exactly the same point in time as the first time T10, but also a period until reaching a time T11 that has lapsed by a very short time Δt (e.g., several milliseconds to several hundred milliseconds) from the first time T10. Similarly, the second timing includes not only exactly the same point in time as the second time T20, but also a period until reaching a time T21 that has lapsed by a very short time Δt (e.g., several milliseconds to several hundred milliseconds) from the second time T20.

In step SP56, the weighting coefficient is set for each AF area.

More specifically, the weighting coefficient of "100%" is set for the focusing target AF area, and the weighting coefficient of "0%" is set for the other AF areas.

For example, when the "nearest AF area" FR2 is newly selected as the focusing target AF area, the weighting coefficient of "100%" is set for the AF area FR2 and the weighting coefficient of "0%" is set for the other AF areas FR1 and FR3 to FR11. As a result, the "nearest AF area" FR2 is determined as a new "selected AF area".

On the other hand, when the "selected AF area" FR1 is continuously selected as the focusing target AF area, the weighting coefficient of "100%" is set for the AF area FR1 and the weighting coefficient of "0%" is set for the other AF areas FR2 to FR11. In this case, the AF area FR1 is continuously maintained as the "selected AF area".

Thus, if the scene change is determined to be not present (step SP14) and if the defocus amount ΔDF is determined to be not larger than the threshold Th (step SP53), the previous "selected AF area" (e.g., FR1) is continuously selected as the focusing target AF area (step SP54). In other words, the AF area (e.g., FR1) having been selected as the "selected AF area" at the first timing is continuously selected as the "selected AF area" at the second timing as well. Accordingly, frequent changes of the selected AF area are suppressed.

Referring to FIG. 6 again, in next step SP17, display of the selected AF area is updated. The selected AF area (i.e., the focusing target AF area) is displayed in the visual field of the optical finder in a superimposed relation to the relevant subject image. The selected AF area is further displayed on the screen of the backside monitor 12 in a superimposed relation to the live view image.

Figure 12:
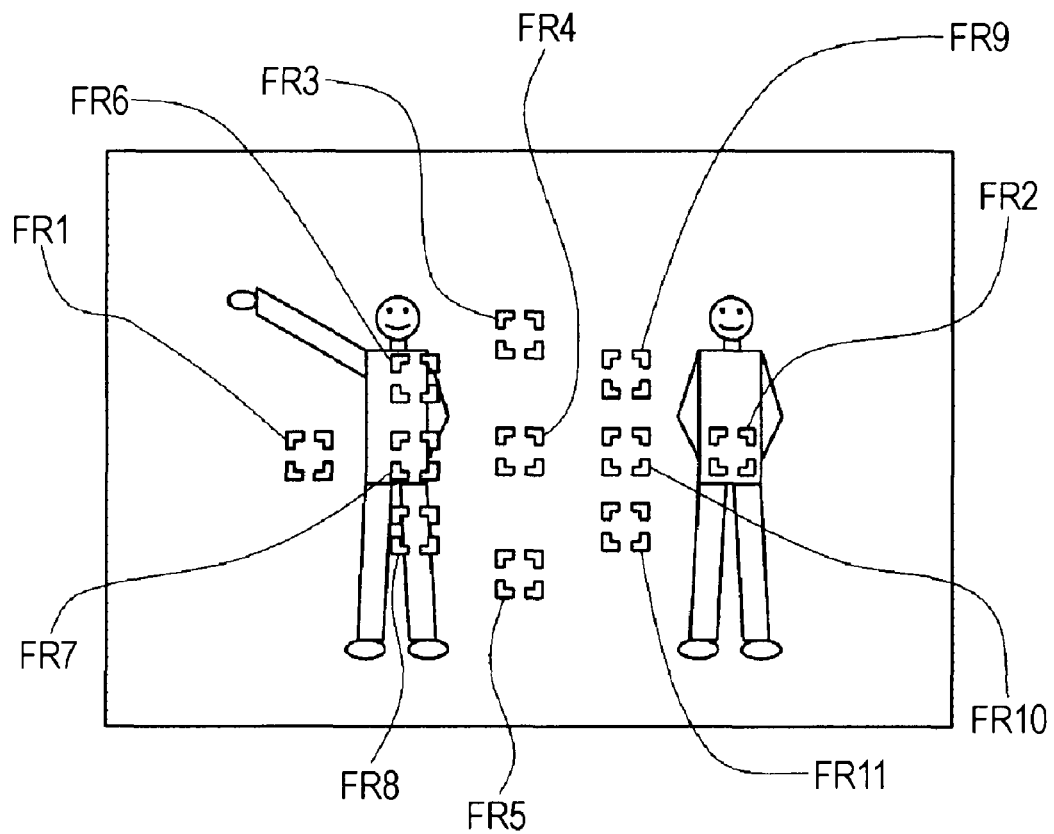
FIG. 12 illustrates a plurality of AF areas.
Figure 13:
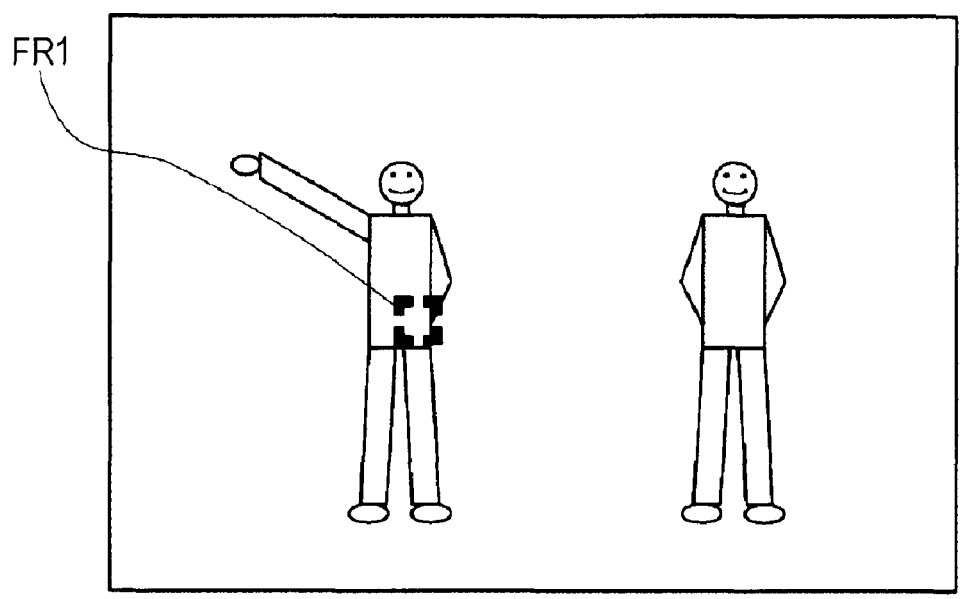
FIG. 13 illustrates a situation where an AF area positioned relatively toward the left is selected as a focusing target AF area.
Figure 14:
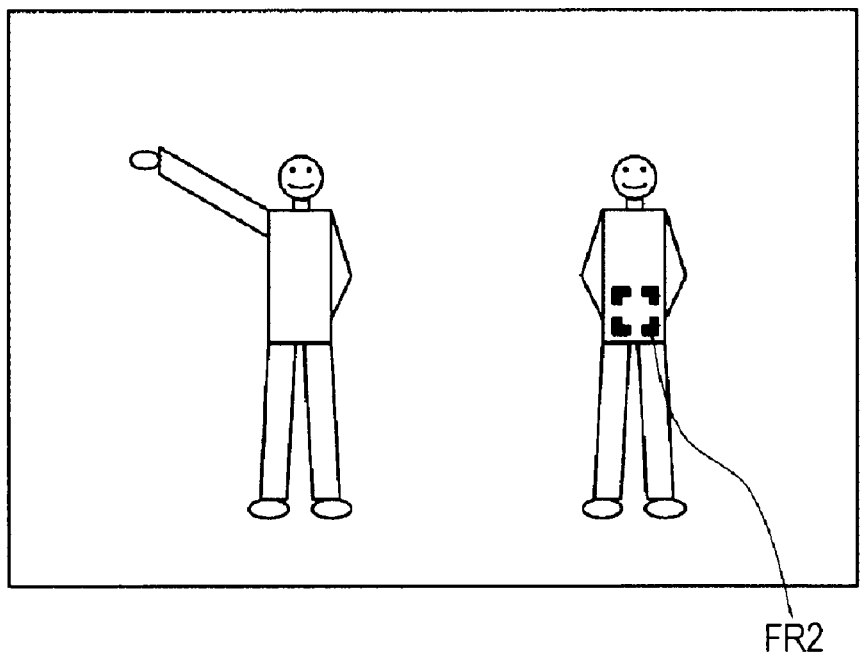
FIG. 14 illustrates a situation where an AF area positioned relatively toward the right is selected as the focusing target AF area.

FIG. 12 illustrates respective positions of a plurality of AF areas within an image. In FIG. 12, the plurality of AF areas FR1 to FR11 are set. FIG. 13 illustrates a situation where the AF area FR1 is selected as the focusing target AF area. In FIG. 13, the AF area FR1 as the selected AF area is displayed at a corresponding position in a subject image (more exactly speaking, near the waist of a person on the left side) in a superimposed relation to the subject image. Further, FIG. 14 illustrates a situation where another AF area FR2 is selected as the focusing target AF area. In FIG. 14, the AF area FR2 as the selected AF area is displayed at a corresponding position in a subject image (more exactly speaking, near the waist of a person on right left side) in a superimposed relation to the subject image.

While this embodiment is described, by way of example, in connection with the case of displaying, as illustrated in FIGS. 13 and 14, only the selected AF area among all the AF areas illustrated in FIG. 12, a manner of displaying the selected AF area is not limited to the described one. In one modification, while displaying all the AF areas as in FIG. 12, the focusing target AF area may be displayed in a manner highlighted to be visually discriminated from the other AF areas by using a different color or form. More specifically, for example, only the focusing target AF area may be displayed in a color differing from that of the other AF areas.

The AF area displayed in step SP17 is the (single) focusing target AF area which has been determined in step SP16 (more exactly speaking, through steps SP54, SP55 and SP56), and the focusing target AF area is avoided from changing frequently. As a result, a frequent shift in display of the focusing target AF area can be suppressed.

In next step SP18, automatic exposure control (AE control) is executed based on the brightness of a region corresponding to the selected AF area which has been selected from among the plurality of AF areas. In practice, the region corresponding to the selected AF area is selected from among a plurality of divided partial regions (not shown) in the photometric element 40, and the AE control operation is executed based on the brightness of the selected region. More specifically, a brightness value Bv (APEX value) of the selected AF area is calculated, and a proper shutter speed (Tv value), proper ISO sensitivity (Sv value), and a proper aperture value (Av value) are determined based on the calculated brightness value Bv.

Herein, because the AF area employed in step SP18 is the focusing target AF area which has been determined in step SP16, the focusing target AF area is avoided from changing frequently. Accordingly, the exposure operation using the focusing target AF area can be stabilized.

In step SP19, it is determined whether the half-pressed state S1 of the release button 11 is not released. If the half-pressed state S1 of the release button 11 is released, the processing returns to step SP11. On the other hand, if the half-pressed state S1 of the release button 11 is continued, the processing advances to step SP20 (FIG. 7). Then, an operation of driving the focus lens (i.e., an AF driving operation) is executed (step SP20), and a distance measuring operation is executed on the plurality of AF areas by the AF module 20, etc. (step SP21). Thereafter, the processing advances to step SP22. In step SP22, it is determined whether the release button 11 is pressed into the fully-pressed state S2. If the release button 11 is not pressed into the fully-pressed state S2, the processing returns to step SP16 again. On the other hand, if the release button 11 is already pressed into the fully-pressed state S2, the processing advances to step SP23. In step SP23, an operation of taking an image by the actual (real) shooting is executed with the camera being in the state illustrated in FIG. 5.

As described above, if it is determined that the scene change is not present, the selected AF area having been selected at the first timing is continuously selected as the focusing target AF area at the second timing.

More specifically, if the scene change is determined to be not present (step SP14) and if the defocus amount ΔDF is determined to be not larger than the threshold Th (step SP53), the "selected AF area" (e.g., FR1) is continuously selected as the focusing target AF area (step SP54). Stated another way, the magnitude of the defocus amount ΔDF is also taken into consideration here in addition to the presence or the absence of a scene change. For example, it is supposed that, after pressing the release button 11 into the half-pressed state S1 in a situation illustrated in FIG. 13, the user presses the release button 11 again into the half-pressed state S1 in the same situation (as that illustrated in FIG. 13). In such a case, the same "selected AF area" (e.g., FR1) as that selected when the release button 11 has been pressed into the half-pressed state S1 for the first time is continuously selected as the focusing target AF area when the release button 11 is pressed into the half-pressed state S1 for the second time. Accordingly, frequent changes of the focusing target AF area are suppressed. Thus, undesired changes of the selected AF area can be suppressed.

Further, if it is determined that the scene change is present (step SP14), the "nearest AF area" (e.g., FR2) is selected as the focusing target AF area regardless of the magnitude of the defocus amount ΔDF (step SP55). Stated another way, the "nearest AF area" (e.g., FR2), which has been determined as a "candidate" for the focusing target AF area in accordance with the predetermined criterion (e.g., the "nearest priority criterion" herein), is selected as the "focusing target AF area" at the second timing. Accordingly, if the scene change is present, the focusing target AF area can be appropriately changed.

Figure 15:
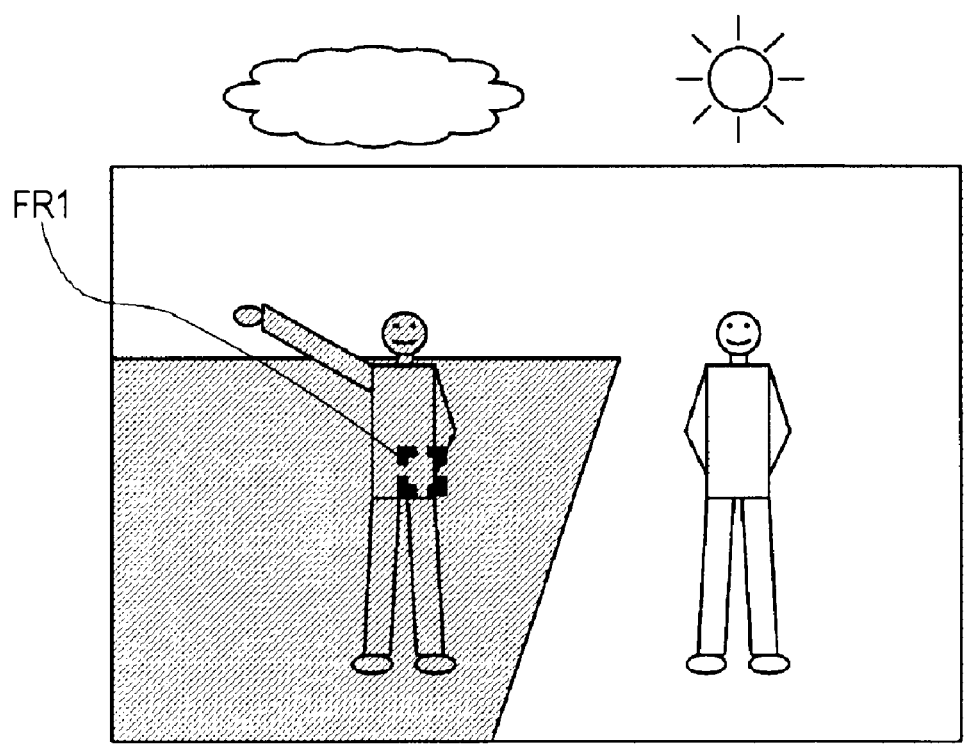
FIG. 15 illustrates one scene of taken image.
Figure 16:
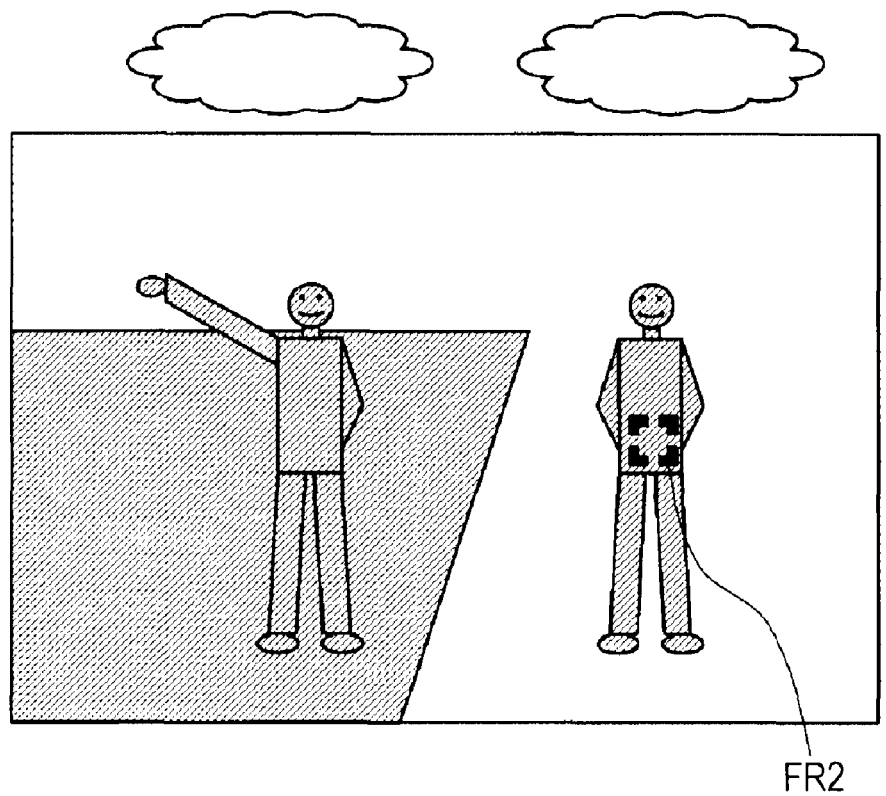
FIG. 16 illustrates another scene of taken image.

For example, it is now assumed that, after pressing the release button 11 into the half-pressed state S1 in a situation illustrated in FIG. 15, the user presses the release button 11 again into the half-pressed state S1 in a situation illustrated in FIG. 16. FIG. 15 illustrates the situation where a person on the left side is present in a shadow and a person on the right side is present in the sun. FIG. 16 illustrates the situation where the person on the left side and the person on the right side are both present in a shadow. Comparing a taken image of FIG. 15 and a taken image of FIG. 16 with each other, a value of the parameter, e.g., brightness, is greatly changed between both the images, and hence a scene change is detected. Accordingly, when the release button 11 is pressed into the half-pressed state S1 again in the situation of FIG. 16, the focusing target AF area is determined again by AF control in accordance with the predetermined criterion, e.g., the nearest priority AF control (also called closest-range priority AF control). Further, if the person on the right side is present closer to the camera in a new scene, an AF area corresponding to the person on the right side is selected as the selected AF area. In such a manner, the focusing target AF area can be appropriately changed.

Figure 17:
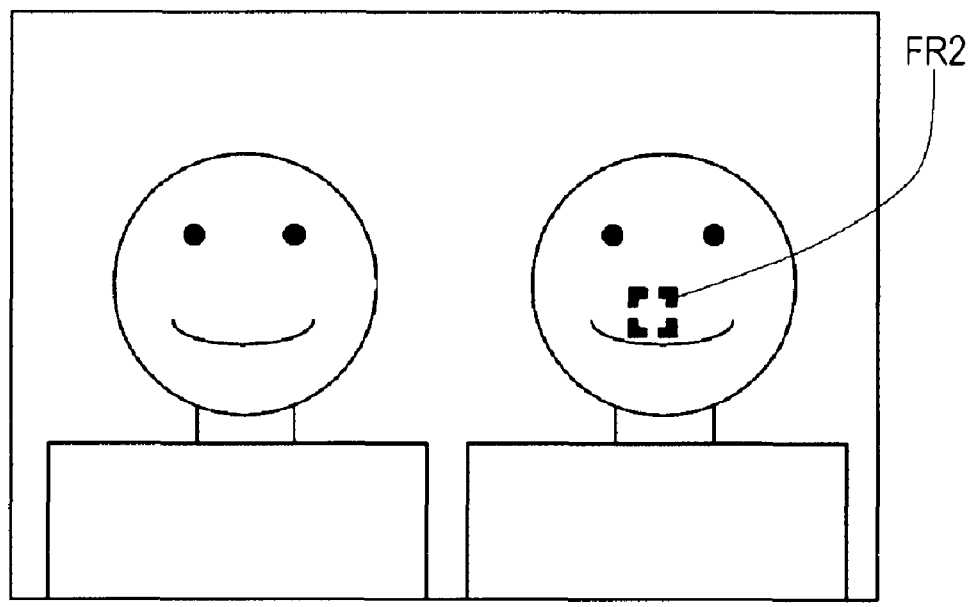
FIG. 17 illustrates still another scene of taken image.

Similarly, it is assumed that, after pressing the release button 11 into the half-pressed state S1 in the situation illustrated in FIG. 15, the user now presses the release button 11 again into the half-pressed state S1 in a situation as illustrated in FIG. 17. FIG. 17 illustrates the situation where images of the two persons are taken in an enlarged scale. Comparing the taken image of FIG. 15 and a taken image of FIG. 17 with each other, values of the parameters, e.g., brightness, contrast and tint, are greatly changed between both the images, and hence a scene change is detected. Further, if the person on the right side is present closer to the camera in a new scene, an AF area corresponding to the person on the right side is selected as the selected AF area. In such a manner, the focusing target AF area can be appropriately changed.

If the defocus amount ΔDF is determined to be larger than the threshold Th (step SP53), the "nearest AF area" (e.g., FR2) is selected as a new focusing target AF area regardless of the presence or the absence of a scene change (step SP55). Stated another way, the "nearest AF area" (e.g., FR2), which has been determined as a "candidate" for the focusing target AF area in accordance with the predetermined criterion (e.g., the "nearest priority criterion" herein), is selected as the "focusing target AF area" at the second timing. Accordingly, even if the scene change is not detected, the focusing target AF area can be appropriately changed, for example, when the subject has moved to a large extent in the direction closer to or away from the camera.

<6. Others>

The embodiment of the present invention has been described above, but the present invention is not limited to the above-described embodiment.

While the above embodiment has been described in connection with the case of executing the AF operation based on the phase-difference AF technique, the present invention is not limited in practical forms to that type of AF operation. For example, the present invention can also be applied to the case of executing the so-called hill-climbing AF control (i.e., autofocus control in which a focusing operation is executed by using, as information for focusing, a predetermined rating value, e.g., a contrast value of the image signal obtained by, e.g., the image pickup element 7). In such a modification, more specifically, a plurality of AF areas are set in an image taken by, e.g., the image pickup element 7, and the in-focus lens position for each of the AF areas is determined based on a predetermined rating value (e.g., a contrast value). Further, the determination result of the determining portion 115 with respect to the presence or the absence of a scene change is utilized when the focusing target AF area is selected from among the plurality of AF areas.

While the above embodiment has been described in connection with the case of using, as the parameters for the scene determination, all of the three parameters (i.e., brightness, contrast and tint), the present invention is not limited in practical forms to that case. For example, one or two of the three parameters may be used as the parameters for the scene determination. Alternatively, one or more parameters other than the three parameters may also be used as the parameters for the scene determination.

In the above-described embodiment, when the release button 11 is continuously held in the half-pressed state S1, the processing returns from step SP22 (FIG. 7) to step SP16 (FIG. 6), and hence the operation from the step SP16 to the step SP22 is repeatedly executed. Accordingly, the focusing target AF area is not changed except for the case that the defocus amount ΔDF is larger than the predetermined value Th (step SP55). However, the present invention is not limited in practical forms to that type of processing. For example, even when the release button 11 is continuously held in the half-pressed state S1, the focusing target AF area may be changed upon detection of a scene change. More specifically, if the determination result is "NO" in step SP22, the processing may return from step SP22 to step SP13 instead of step SP16. With that modification, the scene determination is executed again in step SP13. If there is a scene change, the weights assigned to the AF areas are initialized (steps SP14 and SP15). Therefore, the processing advances from step SP52 to step SP55 and the focusing target AF area is changed.

In the above-described embodiment, even when the scene change is determined to be not present, the selected AF area is exceptionally reset and reselected if the defocus amount ΔDF is larger than the predetermined value Th. However, the present invention is not limited in practical forms to that type of processing. For example, the processing may be modified such that when the scene change is determined to be not present, the selected AF area is not reselected (i.e., the previous AF area is continuously selected) even if the defocus amount ΔDF is larger than the predetermined value Th.

While the above embodiment has been described in connection with the case of selecting, as the focusing target AF area, one among the plurality of AF areas FR1 to FR 11, the present invention is not limited in practical forms to that type of processing. For example, two or more particular number of AF areas may be selected as the focusing target AF areas from among the plurality of AF areas. In such a modification, the weighting coefficient may be set to an appropriate numerical value (e.g., "50%") other than (100%).

While the above embodiment has been described in connection with the case that the release button 11 is operated into the half-pressed state again after the release button 11 has been temporarily operated into the half-pressed state, the present invention is not limited in practical forms to that case.

The above-described concept of the embodiment may also be applied, for example, to the case that the release button 11 is operated into the half-pressed state after a predetermined period (e.g., on the order of several tens milliseconds to several tens seconds) has lapsed subsequent to the fully-pressing operation of the release button 11. In such a situation, more specifically, a scene change may be detected by using the image signal obtained in the half-pressed state S1 of the release button 11 immediately before the fully-pressing operation and values of the parameters for the scene determination, which are derived from that image signal, as well as the image signal obtained at the time of the release button 11 being operated into the half-pressed state again and values of the parameters for the scene determination, which are derived from that image signal.

Alternatively, in continuous shooting, values of the parameters for detecting a scene change may be obtained in match with the timing of taking an image by each actual shooting, and the presence or the absence of a scene change may be detected by using the parameter values. In such a case, as in the above-described embodiment, the operation of selecting the "selected AF area" and the AF operation are executed depending on the detection result of the scene change, following which an image is taken by actual shooting.

While the above embodiment has been described in connection with the case of executing the AF driving operation in response to the pressing of the release button 11, the present invention is not limited in practical forms to that case. For example, the AF driving operation (including the operation of driving the focus lens) may be executed in response to the pressing of an AF button 85 (see FIG. 2), which is an operating member to input (or receive) an AF execution command. The AF execution command is applied as a part of the shooting preparation command (i.e., a portion regarding the AF operation) in independent fashion.

While the above embodiment has been described in connection with the case of obtaining the parameter values for detecting a scene change by using the signal (image signal) produced by the image pickup element 7, the present invention is not limited in practical forms to that case. For example, the parameter values for detecting a scene change may be obtained by using the signal (image signal) produced by the image pickup element 5. Alternatively, the parameter values for detecting a scene change may be obtained by using the signal produced by the photometric element 40. More specifically, "brightness information" of the subject may be obtained by using a brightness signal produced by the photometric element 40. With such a modification, the presence or the absence of a scene change can be determined depending on the presence or the absence of a change of the "brightness information".

Figure 18:
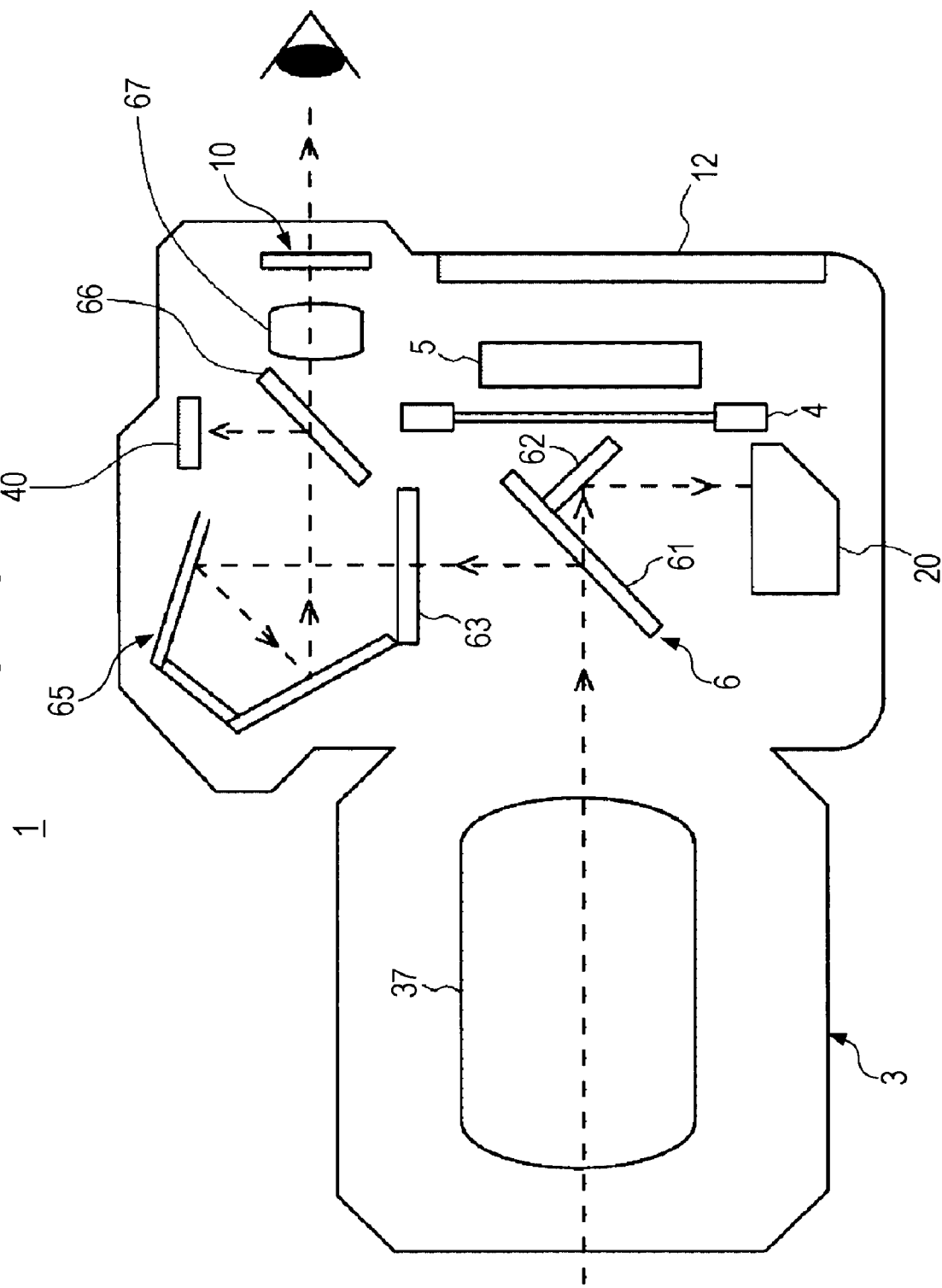
FIG. 18 illustrates an image pickup apparatus according to one modification.

In particular, the above-described concept may also be applied to a digital single-lens reflex camera, illustrated in FIG. 18, which does not include the image pickup element 7 serving as a sub-imager. In such a digital single-lens reflex camera, it is possible to obtain the "brightness information" by using the signal produced by the photometric element 40 and to determine the presence or the absence of a scene change depending on the presence or the absence of a change of the "brightness information".

Figure 19:
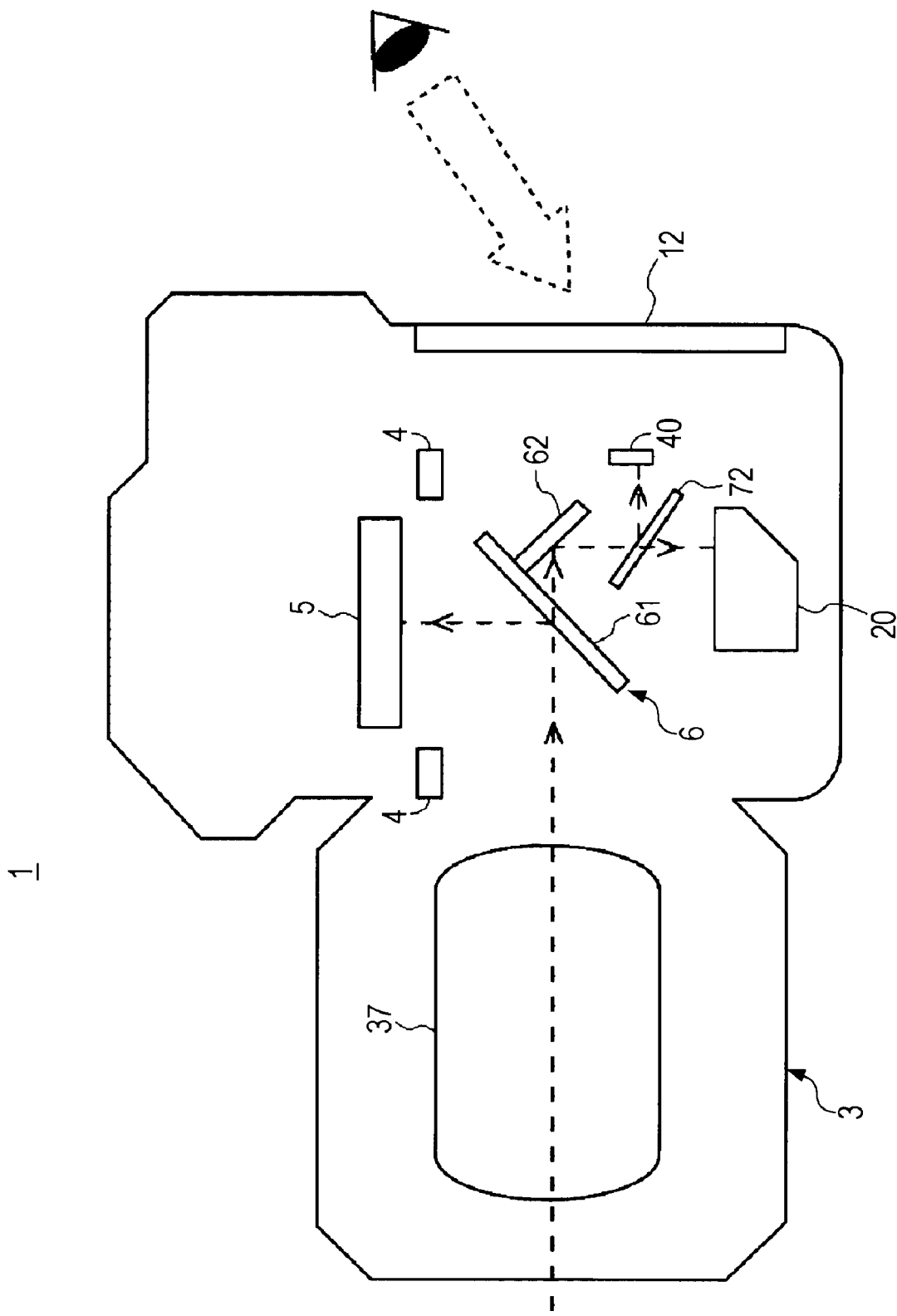
FIG. 19 illustrates an image pickup apparatus according to another modification.

Alternatively, the above-described concept may be applied to a digital camera, illustrated in FIG. 19, in which live view images can be obtained with the image pickup element 5 serving as an image pickup element (main imager) to take an image of the subject by the actual shooting. In such a digital camera, it is possible to obtain a value of at least one appropriate parameter by using the signal (image signal) generated by the image pickup element 5 and to determine the presence or the absence of a scene change depending on the presence or the absence of a change of the parameter value. Further, as illustrated in FIG. 19, a half mirror 72 may be disposed in an optical path extending from the sub-mirror 62 toward the AF module 20 such that a part of light reflected by the half mirror 72 is introduced to the photometric element 40. In addition, the parameter value for the scene determination (e.g., brightness information of the subject) may be obtained by using a brightness signal produced by the photometric element 40.

The present application contains subject matter related to that disclosed in Japanese Priority Patent Application JP 2008-110980 filed in the Japan Patent Office on Apr. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   light receiving means for performing photoelectric conversion of a subject image introduced through an imaging lens, the light receiving means producing a first signal at a first timing and producing a second signal at a second timing later than the first timing;
   acquiring means for acquiring, based on the first signal, a first parameter for detecting a scene change and acquiring, based on the second signal, a second parameter for detecting a scene change;
   determining means for determining the presence or the absence of a scene change based on the first parameter and the second parameter;
   selecting means for selecting a focusing target AF area from among a plurality of AF areas; and
   focusing control means for executing focusing control by using focusing information with respect to the AF area selected by the selecting means,
   wherein when the determining means determines that the scene change is not present, the selecting means selects the AF area having been selected at the first timing, as the focusing target AF area, at the second timing continuously.

2. The image pickup apparatus according to claim 1, further comprising:
   operating means for inputting a shooting preparation command,
   wherein the first signal is produced at the first timing in response to a first shooting preparation command input through the operating means, and
   wherein the second signal is produced at the second timing in response to a second shooting preparation command input through the operating means.

3. The image pickup apparatus according to claim 2, wherein the second shooting preparation command is applied through the operating means again after a state of applying the first shooting preparation command through the operating means has been temporarily released.

4. The image pickup apparatus according to claim 2, wherein the operating means includes a release button.

5. The image pickup apparatus according to claim 2, wherein the operating means includes an operating member for inputting an AF execution command.

6. The image pickup apparatus according to any one of claims 1 to 5, further comprising:
   display means for displaying a position of the focusing target AF area selected from among the plurality of AF areas.

7. The image pickup apparatus according to any one of claims 1 to 5, further comprising:
   exposure control means for executing an exposure control operation based on brightness of a region corresponding to the AF area selected by the selecting means.

8. The image pickup apparatus according to claim 1, wherein each of the first and second parameters represents a value regarding at least one of contrast, brightness, and tint of corresponding one of the first and second signals.

9. The image pickup apparatus according to claim 1, further comprising:
   a first image pickup element for capturing an image of a subject, which is taken by actual shooting,
   wherein the light receiving means includes a second image pickup element for capturing time-serial images of the subject, and
   wherein the acquiring means acquires the first and second parameters based on an image signal produced by the second image pickup element.

10. The image pickup apparatus according to claim 1, wherein the light receiving means includes an image pickup element for capturing an image of a subject, which is taken by actual shooting, and
    wherein the acquiring means acquires the first and second parameters based on a signal produced by the image pickup element.

11. The image pickup apparatus according to claim 1, wherein the light receiving means includes a photometric element for measuring brightness of a subject, and
    wherein the acquiring means acquires the first and second parameters based on a signal produced by the photometric element.

12. The image pickup apparatus according to claim 1, further comprising:
    a phase-difference AF means for detecting, for each of the plurality of AF areas, a position of a focus lens at which a subject corresponding to each AF area is brought into an in-focus state, based on a phase difference technique.

13. An image pickup apparatus comprising:
    selecting means for selecting a focusing target AF area from among a plurality of AF areas;
    focusing control means for executing focusing control by using focusing information with respect to the AF area selected by the selecting means;
    light receiving means for performing photoelectric conversion of a subject image introduced through an imaging lens, the light receiving means producing a first signal at a first timing and producing a second signal at a second timing later than the first timing;
    acquiring means for acquiring, based on the first signal, a first parameter for detecting a scene change and acquiring, based on the second signal, a second parameter for detecting a scene change;
    determining means for determining the presence or the absence of a scene change based on the first parameter and the second parameter; and
    defocus amount calculating means for calculating a defocus amount between a first AF area having been selected as the focusing target AF area at the first timing and a second AF area which is determined as a candidate for the focusing target AF area at the second timing in accordance with a predetermined criterion,
wherein when the determining means determines that the scene change is not present and when the defocus amount is within a predetermined value, the selecting means selects the first AF area, as the focusing target AF area, at the second timing continuously.

14. The image pickup apparatus according to claim 13, wherein when the determining means determines that the scene change is present and when the defocus amount is larger than the predetermined value, the selecting means selects the second AF area, as the focusing target AF area, at the second timing.

15. An image pickup apparatus comprising:
a light receiving unit configured to perform photoelectric conversion of a subject image introduced through an imaging lens, the light receiving unit producing a first signal at a first timing and producing a second signal at a second timing later than the first timing;
an acquiring unit configured to acquire, based on the first signal, a first parameter for detecting a scene change and acquiring, based on the second signal, a second parameter for detecting a scene change;
a determining unit configured to determine the presence or the absence of a scene change based on the first parameter and the second parameter;
a selecting unit configured to select a focusing target AF area from among a plurality of AF areas; and
a focusing control unit configured to execute focusing control by using focusing information with respect to the AF area selected by the selecting unit,
wherein when the determining unit determines that the scene change is not present, the selecting unit selects the AF area having been selected at the first timing, as the focusing target AF area, at the second timing continuously.

16. An image pickup apparatus comprising:
a selecting unit configured to select a focusing target AF area from among a plurality of AF areas;
a focusing control unit configured to execute focusing control by using focusing information with respect to the AF area selected by the selecting unit;
a light receiving unit configured to perform photoelectric conversion of a subject image introduced through an imaging lens, the light receiving unit producing a first signal at a first timing and producing a second signal at a second timing later than the first timing;
an acquiring unit configured to acquire, based on the first signal, a first parameter for detecting a scene change and acquiring, based on the second signal, a second parameter for detecting a scene change;
a determining unit configured to determine the presence or the absence of a scene change based on the first parameter and the second parameter; and
a defocus amount calculating unit configured to calculate a defocus amount between a first AF area having been selected as the focusing target AF area at the first timing and a second AF area which is determined as a candidate for the focusing target AF area at the second timing in accordance with a predetermined criterion,
wherein when the determining unit determines that the scene change is not present and when the defocus amount is within a predetermined value, the selecting unit selects the first AF area, as the focusing target AF area, at the second timing continuously.

* * * * *